US012719603B2

(12) United States Patent
Liang et al.

(10) Patent No.: US 12,719,603 B2
(45) Date of Patent: Aug. 25, 2026

(54) DATA TRANSMISSION METHOD, DEVICE, AND STORAGE MEDIUM

(71) Applicant: ZTE Corporation, Shenzhen (CN)

(72) Inventors: Chulong Liang, Shenzhen (CN); Jin Xu, Shenzhen (CN); Liguang Li, Shenzhen (CN); Guanghui Yu, Shenzhen (CN); Jian Kang, Shenzhen (CN); Qiang Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 220 days.

(21) Appl. No.: 18/565,475

(22) PCT Filed: May 12, 2022

(86) PCT No.: PCT/CN2022/092427
§ 371 (c)(1),
(2) Date: Nov. 29, 2023

(87) PCT Pub. No.: WO2022/252952
PCT Pub. Date: Dec. 8, 2022

(65) Prior Publication Data

US 2024/0267150 A1 Aug. 8, 2024

(30) Foreign Application Priority Data

Jun. 2, 2021 (CN) ......................... 202110615507.8

(51) Int. Cl.
*H04L 1/00* (2006.01)

(52) U.S. Cl.
CPC .......... *H04L 1/0003* (2013.01); *H04L 1/0016* (2013.01)

(58) Field of Classification Search
CPC ... H04L 1/0084; H04L 1/0025; H04L 1/0016; H04L 27/261; H04L 1/0083; H04L 1/0003; H04L 27/0008; H04L 1/0009
See application file for complete search history.

(56) References Cited

U.S. PATENT DOCUMENTS

2016/0330738 A1* 11/2016 Eitan .................... H04L 1/0084
2020/0084778 A1 3/2020 Wang et al.
2020/0366406 A1 11/2020 Kim et al.

FOREIGN PATENT DOCUMENTS

CN 102752261 A 10/2012
CN 109600200 A 4/2019
CN 111357220 A 6/2020
(Continued)

OTHER PUBLICATIONS

First Office Action for Japanese Application No. 2023-574203, mailed Nov. 5, 2024.

(Continued)

*Primary Examiner* — Mahran Y Abu Roumi
(74) *Attorney, Agent, or Firm* — Wolf, Greenfield & Sacks, P.C.

(57) ABSTRACT

A data transmission method, a device, and a storage medium are disclosed. The method may include sending a Modulation and Coding Scheme (MCS) index value to a second communication node; where, the MCS index value is indicative of one sets of parameters of a plurality sets of parameters in an MCS index table; and at least one set of the plurality sets of parameters in the MCS index table correspond to Regular Amplitude Phase Shift Keying (RAPSK) modulation.

16 Claims, 8 Drawing Sheets

(56) References Cited

FOREIGN PATENT DOCUMENTS

| | | | |
|---|---|---|---|
| CN | 111901067 | A | 11/2020 |
| CN | 112583759 | A | 3/2021 |
| EP | 3 444 981 | A1 | 2/2019 |
| JP | 2020-156092 | A | 9/2020 |
| WO | WO 2019/073029 | A1 | 4/2019 |

OTHER PUBLICATIONS

[No Author Listed], Discussion on DL 1024QAM for NR FR1. ZTE 3GPP TSG RAN WG1 #103-e, R1-2007977. Nov. 2020: pp. 1-16.
Ferrand et al., High-Rate Regular APSK Constellations. IEEE Transactions on Communications. Mar. 2019;67(3):2015-23.
Second Office Action for Canadian Application No. 3,221,193, dated Oct. 16, 2025.
Extended European Search Report for European Application No. 22814999.3, dated Apr. 17, 2025.
Notice of Reasons for Refusal for Japanese Application No. 2023-574203, dated Apr. 24, 2025.
Notice of Reasons for Refusal for Japanese Application No. 2023-574203, dated Aug. 8, 2025.
Liu et al., APSK constellation with Gray mapping. IEEE communications letters. Oct. 31, 2011;15(12):1271-3.
Office Action for Canadian Application No. 3,221,193, dated Jan. 2, 2025.
Ferrand et al., High-Rate Regular APSK Constellations. IEEE Transactions on Communications. Dec. 11, 2018;67(3):2015-23.
International Search Report and Written Opinion for International Application No. PCT/CN2022/092427 mailed Aug. 11, 2022.
Ferrand et al., High-rate regular APSK constellations. IEEE Transactions on Communications. Dec. 2018;67(3). 8 pages.
Sandell et al., Efficient demodulation of general APSK constellations. IEEE Signal Processing Letters. Jun. 2016;23(6):868-72.
First Office Action mailed May 22, 2026 in connection with Chinese Application No. 202110615507.8.

* cited by examiner

Send an MCS index value to a second communication node; where the MCS index value is indicative of one of a plurality sets of parameters in an MCS index table; and at least one set of the plurality sets of parameters in the MCS index table corresponds to RAPSK modulation

*(Part I)*

*(Part II)*

(f) Qm = 8, mp = 5, ma = 3, $\theta^* = \pi/32$

*(Part III)*

DATA TRANSMISSION METHOD, DEVICE, AND STORAGE MEDIUM

CROSS-REFERENCE TO RELATED APPLICATION

This application is a national stage filing under 35 U.S.C. § 371 of International Patent Application Serial No. PCT/CN2022/092427, filed May 12, 2022, which claims priority to Chinese patent application No. 202110615507.8 filed Jun. 2, 2021. The contents of these applications are incorporated herein by reference in their entirety.

TECHNICAL FIELD

The present disclosure relates to the field of communication, and in particular to a method and device for data transmission, and a storage medium.

BACKGROUND

Gap in performance exists between the Quadrature Amplitude Modulation (QAM) signal in the fifth Generation mobile communications (5G) standard and capacity-approaching Gaussian Signaling. With the increase in transmission Spectral Efficiency (SE), the gap will exceed 1 dB (in extreme cases, the gap is 1.53 dB). That is, in order to achieve the same spectral efficiency, QAM signals require an increase in the Signal-to-Noise Ratio (SNR) by more than 1 dB compared with Gaussian signals. Under the same spectral efficiency, in order to achieve the same Block Error Rate (BLER), specific bit interleaving and modulation mapping schemes are employed, such that the required SNR of the regular amplitude phase shift keying (RAPSK) constellation is lower than that of the QAM constellation in the 5G standard. Consequently, it is important to design a Modulation and Coding Scheme, MCS) index table for RAPSK constellation.

SUMMARY

In view of this, there is provided a method and a device for data transmission, and a storage medium in some embodiment of the present disclosure, which achieves the configuration of the MCS index table for RAPSK constellation, thus reducing the receiving signal-to-noise ratio on the basis of ensuring the same block error rate.

An embodiment of the present disclosure provides a method for data transmission, which is applied to a first communication node, the method includes, sending a Modulation and Coding Scheme (MCS) index value to a second communication node; where the MCS index value is indicative of one set of parameters in an MCS index table; and the modulation scheme corresponding to at least one group of parameters in the MCS index table is Regular Amplitude Phase Shift Keying (RAPSK) modulation.

An embodiment of the present disclosure provides a method for data transmission, which is applied to a second communication node, the method includes, receiving a Modulation and Coding Scheme (MCS) index value sent by a first communication node; where the MCS index value is indicative of one set of parameters in an MCS index table; and the modulation scheme corresponding to at least one group of parameters in the MCS index table is Regular Amplitude Phase Shift Keying (RAPSK) modulation.

An embodiment of the present disclosure provides an apparatus for data transmission, which includes a communication module, a memory and, at least one processor; the communication module is configured to perform communication interaction between a first communication node and a second communication node; the memory is configured to store at least one program which, when executed by the at least one processor, causes the at least one processor to carry out the method as claimed in any one of the embodiments described above.

An embodiment of the present disclosure provides a computer-readable storage medium storing a computer program which, when executed by a processor, causes the processor to carry out the method as described in any one embodiment as described above.

BRIEF DESCRIPTION OF DRAWINGS

FIG. 3 depicts a flowchart showing a method for data transmission according to another embodiment of the present disclosure;

DETAILED DESCRIPTION

Figures 1, 2:
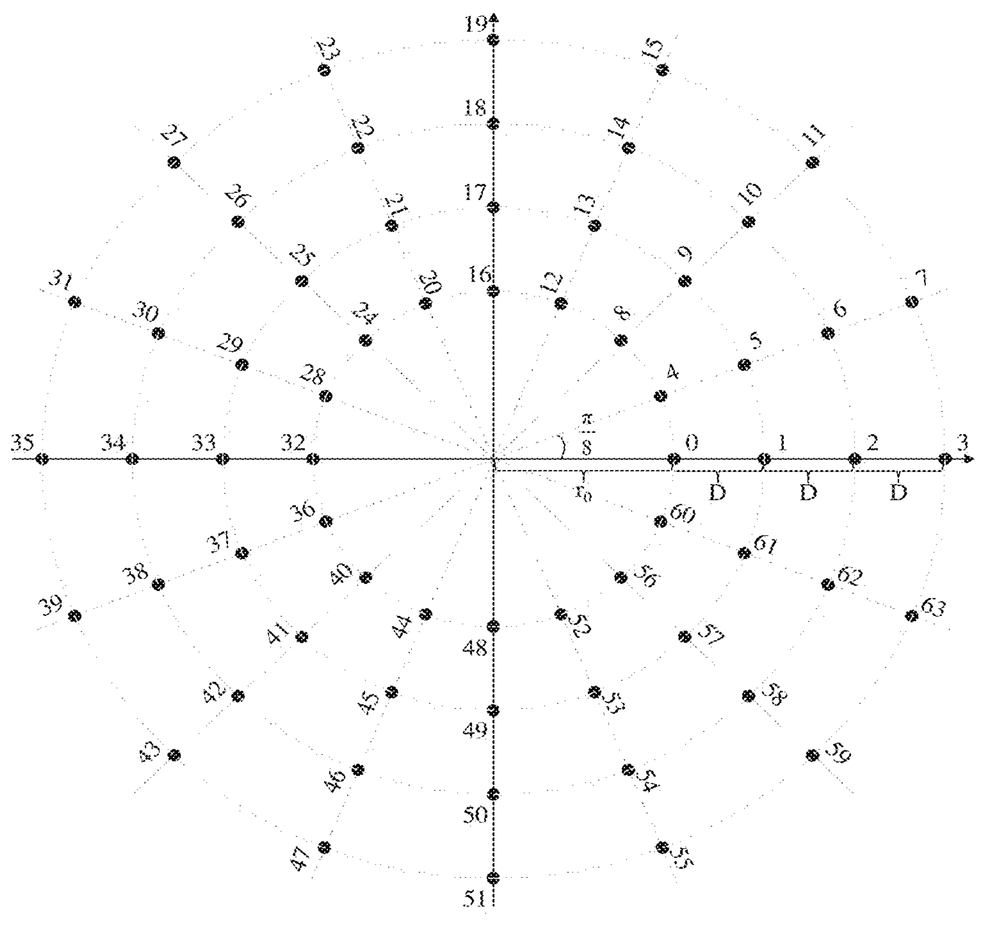
FIG. 1 depicts a schematic diagram showing a RAPSK modulation constellation in the prior art.
FIG. 2 depicts a flowchart showing a method for data transmission according to an embodiment of the present disclosure.

Some embodiments of the present disclosure will be further illustrated with reference to the drawings. Some embodiments of the present disclosure will be described below with reference to the accompanying drawings. It should be understood that the embodiments described herein are intended only for illustration of the present disclosure, but are not intended for limitations to the present disclosure.

During data transmission of the 5G standard, QAM signals require an increase in the receiving signal-to-noise ratio by more than 1 dB in order to achieve the same spectral efficiency, as compared with Gaussian signals. In order to reduce the receiving signal-to-noise ratio and meanwhile achieve the same spectral efficiency, one solution is geometrical shaping, that is, designing a new signal constellation to approximate Gaussian signals. In particular, constellation is a complex set having finite elements, and an element in the set is called a constellation point. For a constellation having $2^{Qm}$ constellation points, Qm is called the modulation order of the constellation, where Qm is a positive integer.

A typical geometric shaping is Amplitude Phase Shift Keying (APSK), which has been applied in a new generation digital satellite broadcasting standard (Digital Video Broadcasting 2nd Generation, DVB-S2). This constellation is characterized by:

(1) All constellation points fall on Na (Na>1) concentric circles, and each circle is also called a ring;

(2) The constellation points on the same ring are equally spaced, that is, the phase differences between each pair of adjacent constellation points are constant;

(3) For i=0, 1, . . . Na−1, the constellation points on the i-th ring have a common phase offset $\theta_i$.

The above characteristics can be expressed by the equation:

$$x = \begin{cases} r_0 \cdot \exp\left(j\left(\frac{2\pi}{n_0} \cdot i + \theta_0\right)\right) & i = 0, 1, \ldots, n_0 - 1 \\ r_1 \cdot \exp\left(j\left(\frac{2\pi}{n_1} \cdot i + \theta_1\right)\right) & i = 0, 1, \ldots, n_1 - 1 \\ \vdots & \vdots \\ r_{Na-1} \cdot \exp\left(j\left(\frac{2\pi}{n_{Na-1}} \cdot i + \theta_{Na-1}\right)\right) & i = 0, 1, \ldots, n_{Na-1} - 1 \end{cases}.$$

In particular, $0 \le r_0 < r_1 < \ldots < r_{Na-1}$ are the radius of Na concentric rings, $n_i$ and $\theta_i$ are the number of constellation points on the ring with radius $r_i$ and the phase offset of constellation points, and $j=\sqrt{-1}$ is the imaginary unit.

The design of MCS Index table based on APSK constellation according to the present disclosure includes:

(1) Design of coordinates of constellation points, i.e., the design of APSK constellation parameters;

(2) Design of mapping from bits to constellation points, which is also called modulation mapping;

(3) Design of parameters required in the MCS table.

Under the same spectral efficiency, in order to achieve the same BLER, RAPSK constellation reduces the required SNR compared with QAM constellation in 5G standard by means of specific bit interleaving and modulation mapping scheme, and an increase in modulation order would result in a reduction in the SNR. Therefore, there is proposed MCS table design based on RAPSK constellation in the present disclosure.

In the 5G standard, the process of bit interleaving and modulation mapping after Low Density Parity Check (LDPC) channel encoding and rate matching is as follows:

(1) Bit interleaving: The bit sequence $e_0, e_1, e_2 \ldots, e_{E-1}$ is first subjected to channel encoding and rate matching, and then is interleaved to a bit sequence $f_0, f_1, f_2 \ldots, f_{E-1}$ as follows, where Om is the modulation order of the QAM constellation.

```
for j = 0 to E/Qm-1
  for i = 0 to Qm-1
    f_{i+j·Qm} = e_{i·E/Qm+j}
  end
end for
```

During the interleaving as discussed above, the bit sequences $e_0, e_1, e_2 \ldots, e_{E-1}$ are arranged into a matrix of Qm rows and E/Qm columns in the so-called "first row then column" manner that the elements are arranged from left to right in the first row on the top-most, if the first row is full, then to the second row, and so on, the elements in the matrix are then one-to-one corresponding to a matrix of Qm rows and E/Qm columns in which the bit sequences $f_0, f_1, f_2 \ldots, f_{E-1}$ are arranged in rows and columns, in the so-called "first column then row" manner that the elements are arranged from top to bottom right in the first column to the left-most, if the first column is full, then to the second column, and so on. For example, if Qm=4 and E=24, the above bit interleaving can be expressed as a matrix:

$$\begin{bmatrix} f_0 & f_4 & f_8 & f_{12} & f_{16} & f_{20} \\ f_1 & f_5 & f_9 & f_{13} & f_{17} & f_{21} \\ f_2 & f_6 & f_{10} & f_{14} & f_{18} & f_{22} \\ f_3 & f_7 & f_{11} & f_{15} & f_{19} & f_{23} \end{bmatrix} = \begin{bmatrix} e_0 & e_1 & e_2 & e_3 & e_4 & e_5 \\ e_6 & e_7 & e_8 & e_9 & e_{10} & e_{11} \\ e_{12} & e_{13} & e_{14} & e_{15} & e_{16} & e_{17} \\ e_{18} & e_{19} & e_{20} & e_{21} & e_{22} & e_{23} \end{bmatrix}.$$

(2) modulation mapping: a modulation mapper takes a binary digit either 0 or 1 as an input and generates a complex-valued modulation symbol as an output.

① $\pi/2$ – Binary Phase Shift Keying (BPSK)

For π/2-BPSK modulation, bit b(i) is mapped to complex-valued modulation symbol d(i), which follows

② BPSK $$d(i) = \frac{e^{j\frac{\pi}{2}(i\,mod\,2)}}{\sqrt{2}}[(1-2b(i)) + j(1-2b(i))]$$

For BPSK modulation, bit b(i) is mapped into a complex-valued modulation symbol d(i), which follows ③ Quadrature phase shift keying (QPSK)

$$d(i) = \frac{1}{\sqrt{2}}[(1-2(i)) + j(1-2b(i))]$$

For QPSK modulation, a pair of bits b(2i) and b(2i+1) are mapped into a complex-valued modulation symbol d(i), which follows

④ 16QAM $$d(t) = \frac{1}{\sqrt{2}}[(1-2b(2i)) + j(1-2b(2i+1))]$$

For 16QAM modulation, a quadruplet of bits b (4i), b (4i+1), b (4i+2) and b (4i+3) are mapped into a complex-valued modulation symbol d(i), which follows

⑤ 64QAM $$d(i) = \frac{1}{\sqrt{10}}$$
$$\{(1-2b(4i))[2-(1-2b(4i+2))] + j(1-2b(4i+1))[2-(1-2b(4i+3))]\}$$

For 64QAM modulation, a hextuplet of bits b (6i), b (6i+1), b (6i+2), b (6i+3), b (6i+4) and b (6i+5) are mapped into a complex-valued modulation symbol d(i), which follows

⑧ 256 QAM $$d(i)=\frac{1}{\sqrt{42}}\{(1-2b(6i))[4-(1-2b(6i+2))[2-(1-2b(6i+4))]]+j(1-2b(6i+1))[4-(1-2b(6i+3))[2-(1-2b(6i+5))]]\}$$

For 256QAM modulation, an octuplet of bits b (8i), b (8i+1), b (8i+2), b (8i+3), b (8i+4), b (8i+5), b (8i+6) and b(8i+7) are mapped into a complex-valued modulation symbol d(i), which follows $$d(i)=\frac{1}{\sqrt{170}}\{(1-2b(8i))[8-(1-2b(8i+2))[4-(1-2b(8i+4))[2-(1-2b(8i+6))]]]+j(1-2b(8i+1))[8-(1-2b(8i+3))[4-(1-2b(8i+5))[2-(1-2b(8i+7))]]]\}$$

where $j=\sqrt{-1}$ in the above equations represents the imaginary unit. From the above equations, it can be seen that the modulation mapping of QAM modulation with modulation order Om follows the following rules:

(1) bit b (Qm·i) determines the sign (either "+" or "−") of the real part of the complex-valued modulation symbol d(i).

(2) bit b (Qm·i+1) determines the sign of the imaginary part of the complex-valued modulation symbol d(i).

(3) bits b (Qm·i+2), . . . , b (Qm·i+Qm−2) determine the absolute value of the real part of the complex-valued modulation symbol d(i).

(4) bits b (Qm·i+3), . . . , b (Qm·i+Qm−1) determine the absolute value of the imaginary part of the complex-valued modulation symbol d(i).

In the 5G standard, the MCS index table based on QAM modulation is shown in Table 1-Table 5. When the modulation order Qm=1, π/2-BPSK modulation is employed. When the modulation order Qm=2, QPSK modulation is employed. When the modulation order Qm=4, 16QAM modulation is employed. When the modulation order Qm=6, 64QAM modulation is employed. When the modulation order Qm=8, 256QAM modulation is employed. In Table 4 and Table 5, if the higher layer parameter "tp-pi2BPSK" is configured, then q=1, otherwise q=2.

TABLE 1

MCS index table #1 based on PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |

TABLE 1-continued

MCS index table #1 based on PDSCH

| MCS Index $I_{MCS}$ | Modulation Order $Q_m$ | Target code Rate R × [1024] | Spectral efficiency |
|---|---|---|---|
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 2

MCS index table #2 based on PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 3

MCS index table #3 based on PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |

TABLE 3-continued

MCS index table #3 based on PDSCH

| MCS Index $I_{MCS}$ | Modulation Order $Q_m$ | Target code Rate R × [1024] | Spectral efficiency |
|---|---|---|---|
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

TABLE 4

MCS index table #1 of PUSCH based on precoding and 64QAM

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

TABLE 5

MCS index table #2 of PUSCH based on precoding and 64QAM

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

1024QAM modulation is additionally employed in the present disclosure. For 1024QAM modulation, a 10-tuplet of bits b(i), b(i+1), b(i+2), b(i+3), b(i+4), b(i+5), b(i+6), b(i+7), b(i+8), b(i+9) are mapped into a complex-valued modulation symbol x, which follows $$x = \frac{1}{\sqrt{682}}\{(1-2b(i))[16-(1-2b(i+2))[8-(1-2b(i+4))[4-(1-2b(i+6))[2-(1-2b(i+8))]]]]+j(1-2b(i+1))[16-(1-2b(i+3))[8-(1-2b(i+5))[4-(1-2b(i+7))[2-(1-2b(i+9))]]]]\}.$$

In the prior art, a variety of APSK constellations have been proposed, while the MCS index table is designed based on RAPSK constellations in the present disclosure. RAPSK constellation is closely related to Gray mapped amplitude phase shift keying (Gray-APSK) constellation. Gray-APSK constellation is characterized by:

(1) All the constellation points fall on Na (Na>1) concentric rings and Na=$2^{ma}$ represents a power of 2, where Na denotes the number of rings and ma is a positive integer, which denotes the number of bits for amplitude mapping.

(2) The radius of the i-th ring $$r_i = \sqrt{-\ln\left[1 - \frac{i+0.5}{Na}\right]},$$

$$i = 0, 1, 2 \ldots, Na-1,$$

where $r_0$ is the minimum radius.

(3) The constellation points on the same ring are equally spaced, that is, the phase differences between each pair of adjacent constellation points are constant. The number of constellation points on each ring is identical and equals a power of 2, i.e., $n_0=n_1= \ldots =n_{Na-1}=Np=2^{mp}$ where Np denotes the number of points per ring, or the different number of phases on the concentric ring; and mp is a positive integer, which depicts the number of bits for phase mapping.

(4) The constellation points on all rings have a common phase offset, i.e., $\theta_0=\theta_1= \ldots =\theta_{Na-1}=\theta^*$, where $\theta^*$ is an arbitrary constant real number.

(5) There is a one-to-one mapping between $2^{Qm}$ constellation points of Gray-APSK and Qm-tuples of bits, which is called Gray-APSK modulation mapping, where Qm=ma+mp. Gray-APSK modulation mapping satisfies gray mapping in which:

① The modulation mapping of any two adjacent constellation points on the same ring differs by one bit, i.e., the Hamming distance is 1.

② The modulation mapping of any two adjacent constellation points in the same phase differs by one bit, i.e., the Hamming distance is 1.

RAPSK constellation is characterized by:

(1) Satisfying the characteristics of items (1), (3) and (4) of Gray-APSK constellation.

(2) The radius of the i-th ring $r_i$ is $$r_i = r_0 + i \cdot D,$$

where $r_0$ is a real number greater than 0 and less than 1; D>0 is the radius difference between adjacent rings, i.e., the inter-ring distance between adjacent rings, and D is a function of the minimum radius $r_0$ to and the number of rings, Na, for example, $$D = \frac{3r_0}{(2Na-1)} \cdot \left(\sqrt{1 + \frac{2(1-r_0^2)(2 \cdot Na - 1)}{3r_0^2(Na-1)}} - 1\right).$$

(3) Natural mapping is employed for the modulation mapping of Qm=ma+mp bits of constellation points, that is, for constellation point $$r_i \cdot \exp\left(j \cdot \left(\frac{2\pi k}{Np} + \theta^*\right)\right),$$

the bit mapping is a concatenation of binary representations of ma bits and mp bits of integers i and k. As an example, ma=2, mp=4, i=3 and k=10, then (i) The modulation mapping can be "111010", where the first two bits "11" are binary representations of i=3 and the last four bits "1010" are binary representations of k=10.

(ii) The modulation mapping can be "101011", where the first four bits "1010" are binary representations of k=10 and the last two bits "11" are binary representations of i=3.

(iii) The modulation mapping can also be "101110", where the 1st, 2nd, 4th and 6th bits "1010" are binary representations of k=10, and the 3rd and 5th bits "11" are binary representations of i=3.

FIG. 1 depicts a schematic diagram showing a RAPSK modulation constellation in the prior art. As shown in FIG. 1, this constellation is a schematic diagram of a RAPSK modulation constellation with modulation order Qm=6, Na (number of rings)=4, number of points per concentric ring Np=16 (i.e., number of bits for amplitude mapping, ma=2, number of bits for phase mapping, mp=Qm−ma=4) and phase offset $\theta^*$, where $r_0$ is the minimum radius of the constellation, inter-ring distance is D, and natural mapping is employed. FIG. 1 depicts a schematic diagram of RAPSK modulation with modulation order Qm=6 by means of natural modulation mapping, and the black dots in FIG. 1 are constellation points.

In the present disclosure, RAPSK constellation is incorporated with Gray mapping to achieve RAPSK with Gray mapping. Through the joint design of bit mapping and bit interleaving, the signal-to-noise ratio required to achieve the same block error rate is reduced. On this basis, MCS index table based on RAPSK modulation is designed.

FIG. 2 depicts a flowchart showing a method for data transmission according to an embodiment of the present disclosure. The method according to this embodiment can be performed by a device for data transmission. The device for data transmission may be a first communication node. In an example, the first communication node is a base station. As shown in FIG. 2, the method according to this embodiment includes operation S210.

At S210, an MCS index value is sent to a second communication node.

The MCS index value is indicative of one group of parameters in an MCS index table. The modulation corresponding to at least one group of parameters in the MCS index table is RAPSK modulation.

In an embodiment, the second communication node refers to the terminal device side, for example, the second communication node can be a user equipment. In an embodiment, the first communication node modulates a transport block and sends the modulated transport block and the MCS index value of the transport block to the second communication node. The MCS index value is indicative of a set of parameters in the MCS index table, and the MCS index table contains at least one set of parameters corresponding to RAPSK modulation.

In an embodiment, the MCS index table includes at least one of, MCS index values; modulation order; target code rate; spectrum efficiency; number of concentric rings; number of constellation points on each concentric ring or different modulation phases on each concentric ring; number of bits for amplitude mapping; number of bits for phase mapping; minimum radius; inter-ring distance; or RAPSK modulation mapping scheme. In an embodiment, the MCS index table includes a plurality column of parameters, and each column of parameters can be at least one of, MCS index values; modulation order; target code rate; spectrum efficiency; number of concentric rings; number of constellation points on each concentric ring or different modulation phases on each concentric ring; number bits for amplitude mapping; number of bits for phase mapping; minimum radius; inter-ring distance; or RAPSK modulation mapping scheme. In an embodiment, an MCS index value indicates one set of parameters in the MCS index table, which means that the MCS index value indicates one row of parameters in the MCS index table, and each row of parameters in the MCS index table may include at least one of, MCS index values; modulation order; target code rate; spectrum efficiency; number of concentric rings; number of constellation points on each concentric ring or different modulation phases on each concentric ring; number of bits for amplitude mapping; number of bits for phase mapping; minimum radius; inter-ring distance; or RAPSK modulation mapping scheme.

In an embodiment, the modulation scheme corresponding to at least one MCS index value in the MCS index table is QAM modulation.

In an embodiment, in the MCS index table, the modulation order of the QAM modulation is the maximum modulation order in the MCS index table.

In an embodiment, the modulation scheme corresponding to the maximum spectral efficiency in the MCS index table is QAM modulation.

In an embodiment, in the MCS index table, when the modulation order is "4", the spectral efficiency corresponding to the RAPSK modulation scheme is greater than 1.3 and less than 3.1.

In an embodiment, in the MCS index table, when the modulation order is "6", the spectral efficiency corresponding to the RAPSK modulation scheme is greater than 2.5 and less than 5.2.

In an embodiment, in the MCS index table, when the modulation order is "8", the spectral efficiency corresponding to the RAPSK modulation scheme is greater than 4.5 and less than 7.1.

In an embodiment, in the MCS index table, when the modulation order is "10", the spectral efficiency corresponding to the RAPSK modulation scheme is greater than 6.5 and less than 9.3.

In an embodiment, the RAPSK modulation includes RAPSK with Gray mapping.

Figure 3:
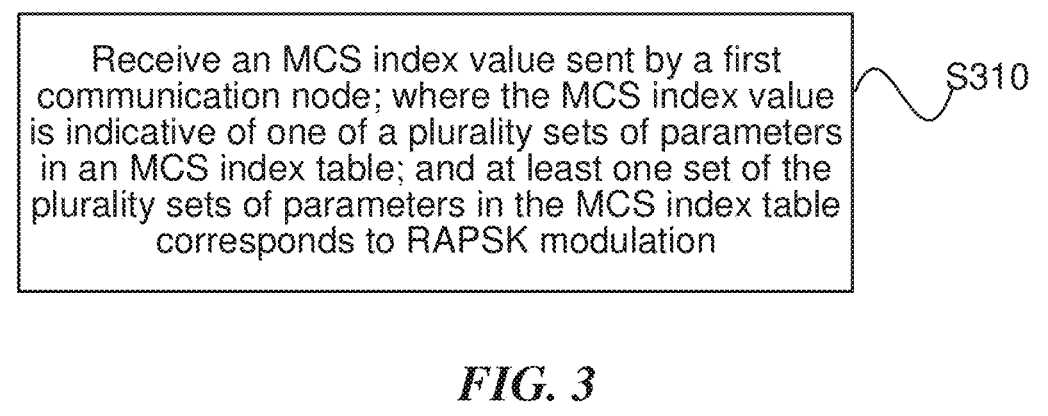

FIG. 3 depicts a flowchart showing a method for data transmission according to another embodiment of the present disclosure. The method according to this embodiment can be performed by a device for data transmission. The device for data transmission may be a second communication node. In an example, the second communication node is a terminal device (e.g., a user equipment). As shown in FIG. 3, the method according to this embodiment includes operation S310.

At S310, an MCS index value sent by a first communication node is received.

The MCS index value is indicative of one group of parameters in an MCS index table. The modulation scheme corresponding to at least one group of parameters in the MCS index table is RAPSK modulation.

In an embodiment, the MCS index table includes at least one of, MCS index values; modulation order; target code rate; spectrum efficiency; number of concentric rings; number of constellation points on each concentric ring or different modulation phases on each concentric ring; number of bits for amplitude mapping; number of bits for phase mapping; minimum radius; inter-ring distance; or RAPSK modulation mapping scheme.

In an embodiment, the modulation scheme corresponding to at least one MCS index value in the MCS index table is QAM modulation.

In an embodiment, in the MCS index table, the modulation order of the QAM modulation is the maximum modulation order in the MCS index table.

In an embodiment, the modulation scheme corresponding to the maximum spectral efficiency in the MCS index table is QAM modulation.

In an embodiment, in the MCS index table, when the modulation order is "4", the spectral efficiency corresponding to the RAPSK modulation scheme is greater than 1.3 and less than 3.1.

In an embodiment, in the MCS index table, when the modulation order is "6", the spectral efficiency corresponding to the RAPSK modulation scheme is greater than 2.5 and less than 5.2.

In an embodiment, in the MCS index table, when the modulation order is "8", the spectral efficiency corresponding to the RAPSK modulation scheme is greater than 4.5 and less than 7.1.

In an embodiment, in the MCS index table, when the modulation order is "10", the spectral efficiency corresponding to the RAPSK modulation scheme is greater than 6.5 and less than 9.3.

In an embodiment, the RAPSK modulation includes RAPSK with Gray mapping.

Embodiment One discusses a case where the first communication node is a base station, the second communication node is a terminal device, and the base station is transmitting a transport block to the terminal device by way of example to illustrate the data transmission process. In an embodiment, the base station sends a transport block to the terminal device, which can be understood as that the base station modulates the transport block and sends the modulated transport block to the terminal device. The base station sends the transport block along with the MCS index value to the terminal device.

In an embodiment, the first communication node sends the modulated transport block and the MCS index value of the transport block to the second communication node. The MCS index value is indicative of a set of parameters in the MCS index table having therein at least one set of parameters whose modulation scheme corresponds to RAPSK modulation.

In an embodiment, the first communication node obtains a bit sequence $f_0, f_1, f_2 \ldots, f_{E-1}$ after performing at least one of the following operations on a transport block, channel coding, rate matching, bit interleaving, code block concatenation, or scrambling.

The first communication node maps the bit sequence $f_0, f_1, f_2 \ldots, f_{E-1}$ to a complex symbol sequence $x_0, x_1, x_2 \ldots, x_{E/Qm-1}$ according to a modulation scheme corresponding to the MCS index value, and sends the mapped sequence to the second communication node, where E is a positive integer, which denotes the length of the bit sequence $f_0, f_1, f_2 \ldots, f_{E-1}$, and Qm is the modulation order of the modulation scheme corresponding to the MCS index value.

The first communication node sends in the downlink control information, the MCS index value of the transport block to the second communication node. The MCS index value is an index value in the MCS index table, which is indicative of a set of parameters for modulation and coding scheme of the transport block, and the MCS index table has at least one MCS index value corresponding to RAPSK modulation.

A set of parameters in the MCS index table includes at least one of, MCS index value; modulation order Qm; target code rate R, or R multiplied by a constant K, where K is a positive number; spectral efficiency; modulation scheme;

number of concentric rings Na; number of points per ring, or number of different phases on each concentric ring, Np; number of bits for amplitude mapping, ma; number of bits for phase mapping, mp; minimum radius $r_0$; inter-ring distance or radii differences of adjacent concentric rings, D; or RAPSK modulation mapping scheme.

Embodiment Two discusses a case where the first communication node is a base station, the second communication node is a terminal device, and the terminal device is receiving a transport block from the base station by way of example to illustrate the data transmission process. In an embodiment, the base station modulates the transport block and sends the modulated transport block to the terminal device. The base station sends the transport block along with the MCS index value to the terminal device.

In an embodiment, the second communication node receives the modulated transport block and the MCS index value of the transport block sent by the first communication node.

The MCS index value is indicative of a set of parameters in the MCS index table, and the MCS index table contains at least one set of parameters corresponding to RAPSK modulation.

In this embodiment, the MCS index value received by the second communication node is the index value in the MCS index table, which is indicative of the modulation coding scheme of the transport block received by the second communication node, and at least one MCS index value in the MCS index table corresponds to RAPSK modulation.

A set of parameters in the MCS index table includes at least one of, MCS index value; modulation order Qm; target code rate R, or R multiplied by a constant K, where K is a positive number; spectral efficiency; modulation scheme; number of concentric rings Na; number of points per ring, or number of different phases on a concentric ring, Np; number of bits for amplitude mapping, ma; number of bits for phase mapping, mp; minimum radius $r_0$; inter-ring distance or radii differences of adjacent concentric rings, D; or RAPSK modulation mapping scheme.

Embodiment Three discusses a case where the first communication node is a base station, the second communication node is a terminal device, and the terminal device is transmitting a transport block to the base station by way of example to illustrate the data transmission process. In an embodiment, the terminal device transmits the transport block to the base station, which can be understood as that the terminal device modulates the transport block and sends the modulated transport block to the base station.

In an embodiment, the second communication node receives the MCS index value sent by the first communication node and sends the modulated transport block to the first communication node. The MCS index value is indicative of a set of parameters in the MCS index table, and the MCS index table contains at least one set of parameters corresponding to RAPSK modulation.

In this embodiment, the second communication node performs at least one of the following operations on the transport block to obtain a bit sequence $f_0, f_1, f_2 \ldots, f_{E-1}$: channel coding, rate matching, bit interleaving; code block concatenation, or scrambling.

The second communication node maps the bit sequence $f_0, f_1, f_2 \ldots, f_{E-1}$ to a complex symbol sequence $x_0, x_1, x_2, \ldots, f_{E/Qm-1}$ according to a modulation scheme corresponding to the MCS index value, and sends the mapped sequence to the first communication node, where E is a positive integer, which denotes the length of the bit sequence $f_0, f_1, f_2 \ldots, f_{E-1}$, and Qm is the modulation order of the modulation scheme corresponding to the MCS index value.

The second communication node receives the MCS index value of the transport block sent by the first communication node in the downlink control information, where the MCS index value is an index value in the MCS index table, which is indicative of a set of parameters in the MCS index table, and at least one MCS index value in the MCS index table corresponds to RAPSK modulation.

A set of parameters in the MCS index table includes at least one of, MCS index value; modulation order Qm; target code rate R, or R multiplied by a constant K, where K is a positive number; spectral efficiency; modulation scheme; number of concentric rings Na; number of points per ring, or number of different phases per concentric ring, Np; number of bits for amplitude mapping, ma; number of bits for phase mapping, mp; minimum radius $r_0$; inter-ring distance or radii differences of adjacent concentric rings, D; or RAPSK modulation mapping scheme.

Embodiment Four discusses a case where the first communication node is a base station, the second communication node is a terminal device, and the base station is receiving a transport block sent by the terminal device by way of example to illustrate the data transmission process. In an embodiment, the base station receives the transport block sent by the terminal device, which can be understood as that the terminal device modulates the transport block and sends the modulated transport block to the base station.

In an embodiment, a first communication node sends an MCS index value to a second communication node and receives a modulated transport block sent by the second communication node. The MCS index value is indicative of a set of parameters in the MCS index table, and the MCS index table contains at least one set of parameters corresponding to RAPSK modulation.

In this embodiment, the first communication node sends in the downlink control information, the MCS index value of the transport block to the second communication node. The second communication node performs at least one of the following operations on the transport block to obtain a bit sequence $f_0, f_1, f_2 \ldots, f_{E-1}$: channel coding, rate matching, bit interleaving; code block concatenation, or scrambling.

The second communication node maps the bit sequence $f_0, f_1, f_2 \ldots, f_{E-1}$ to a complex symbol sequence $x_0, x_1, x_2, \ldots, x_{E/Qm-1}$ according to a modulation scheme corresponding to the MCS index value, and sends the mapped sequence to the first communication node, where E is a positive integer, which denotes the length of the bit sequence for $f_0, f_1, f_2 \ldots, f_{E-1}$, and Qm is the modulation order of the modulation scheme corresponding to the MCS index value.

The MCS index value is an index value in the MCS index table, which is indicative of a set of parameters for modulation and coding scheme of the transport block, and the MCS index table has at least one MCS index value corresponding to RAPSK modulation.

A set of parameters in the MCS index table includes at least one of, modulation order Qm; target code rate R, or R multiplied by a constant K, where K is a positive number; spectral efficiency; modulation scheme; number of concentric rings Na; number of points per ring, or number of different phases on a concentric ring, Np; number of bits for amplitude mapping, ma; number of bits for phase mapping, mp; minimum radius $r_0$; inter-ring distance or radii differences of adjacent concentric rings, D; or RAPSK modulation mapping scheme.

Embodiment Five discusses a case where an MCS index table includes both RAPSK modulation scheme and QAM modulation scheme, and illustrates the design of MCS index table for RAPSK constellation.

This embodiment further illustrates the characteristics of MCS index table on the basis of any of the above embodiments. The difference between this embodiment and any of the above embodiment is that the MCS index table further has one of the following three characteristics.

In the MCS index table, at least one MCS index value is indicative of the QAM modulation.

In the MCS index table, the modulation order Qm of QAM modulation is always the largest one throughout the MCS index table.

The modulation scheme corresponding to the maximum spectral efficiency in MCS index table is the QAM modulation.

Embodiment Six discusses the relationship between the modulation order and the spectral efficiency interval of RAPSK modulation in the MCS index table. This embodiment further illustrates the characteristics of MCS index table on the basis of any of the above embodiments.

The difference between this embodiment and any of the above embodiment is that the MCS index table further has the following characteristics.

In the MCS index table, when the modulation order Qm=4, the spectral efficiency corresponding to the RAPSK modulation scheme is greater than 1.3 and less than 3.1.

In the MCS index table, when the modulation order Qm=6, the spectral efficiency corresponding to RAPSK modulation scheme is greater than 2.5 and less than 5.2.

In the MCS index table, when the modulation order Qm=8, the spectrum efficiency corresponding to the modulation order Qm=8 and RAPSK modulation scheme is greater than 4.5 and less than 7.1.

In the MCS index table, when the modulation order Qm=10, the spectral efficiency corresponding to RAPSK modulation scheme is greater than 6.5 and less than 9.3.

Figure 4:
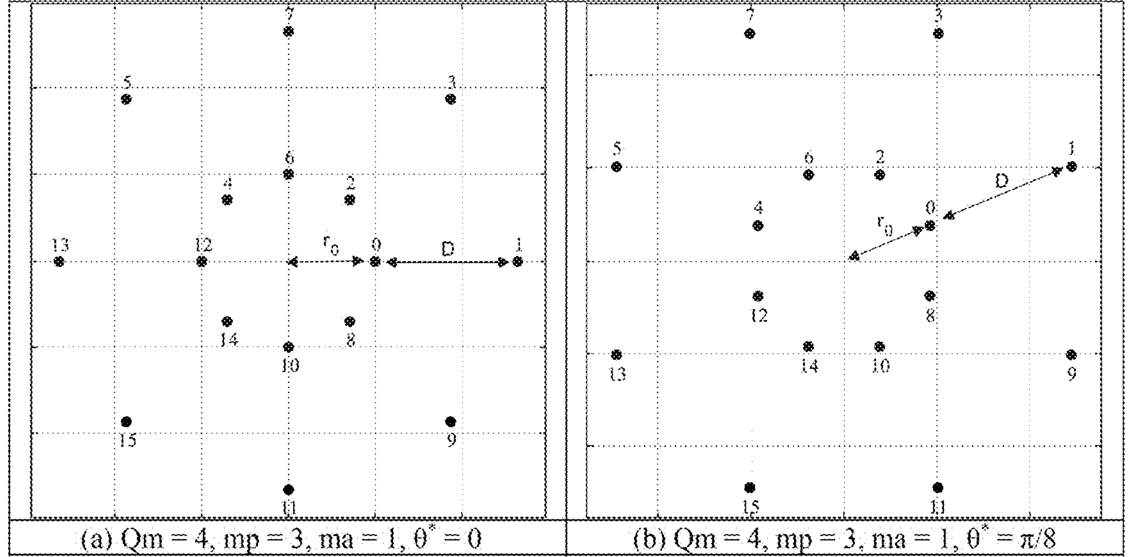
FIG. 4 (comprising Parts I, II, and III) depicts a schematic diagram showing a RAPSK modulation constellation according to an embodiment of the present disclosure.
Figure 4:
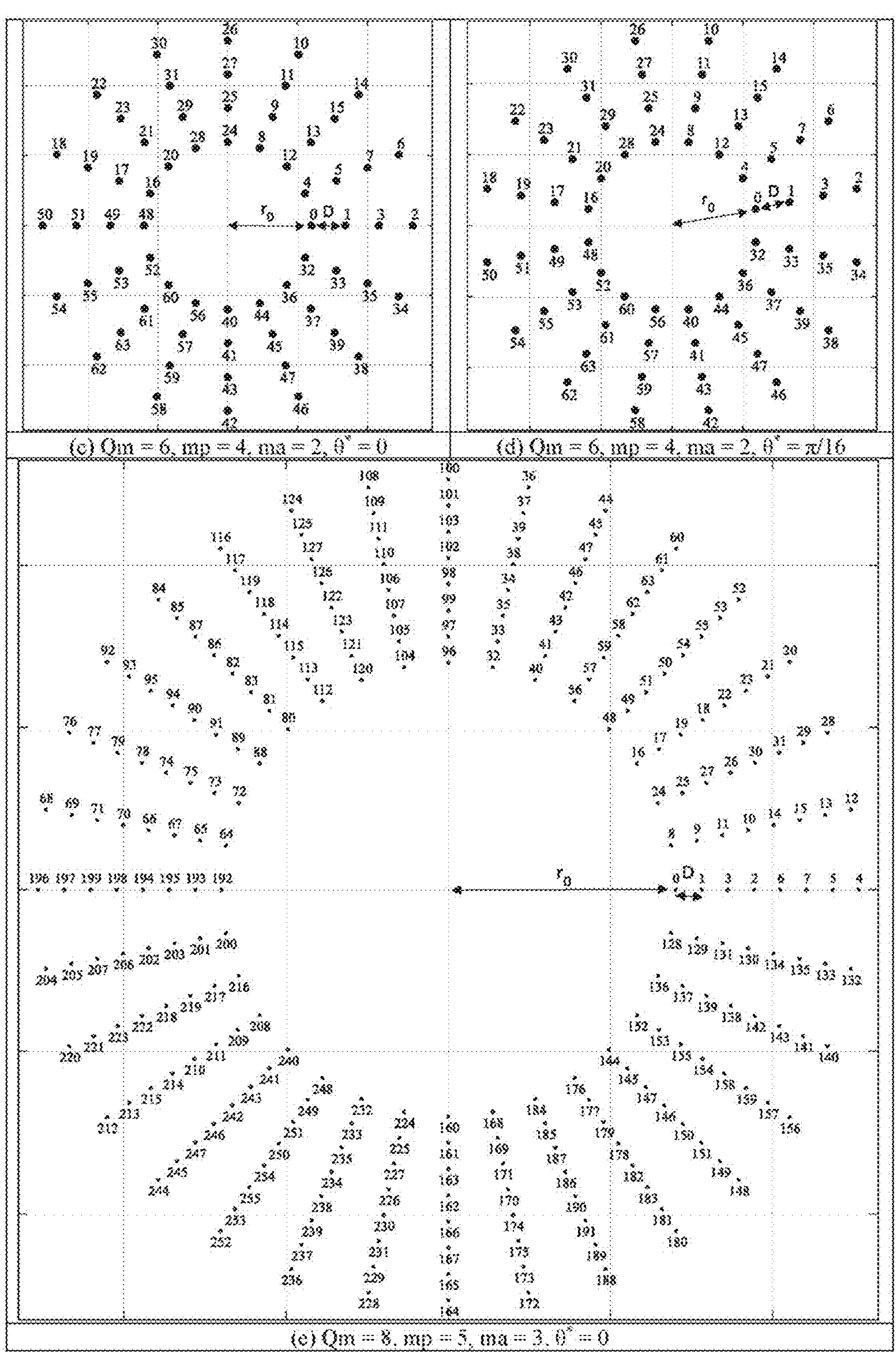
Figure 4:
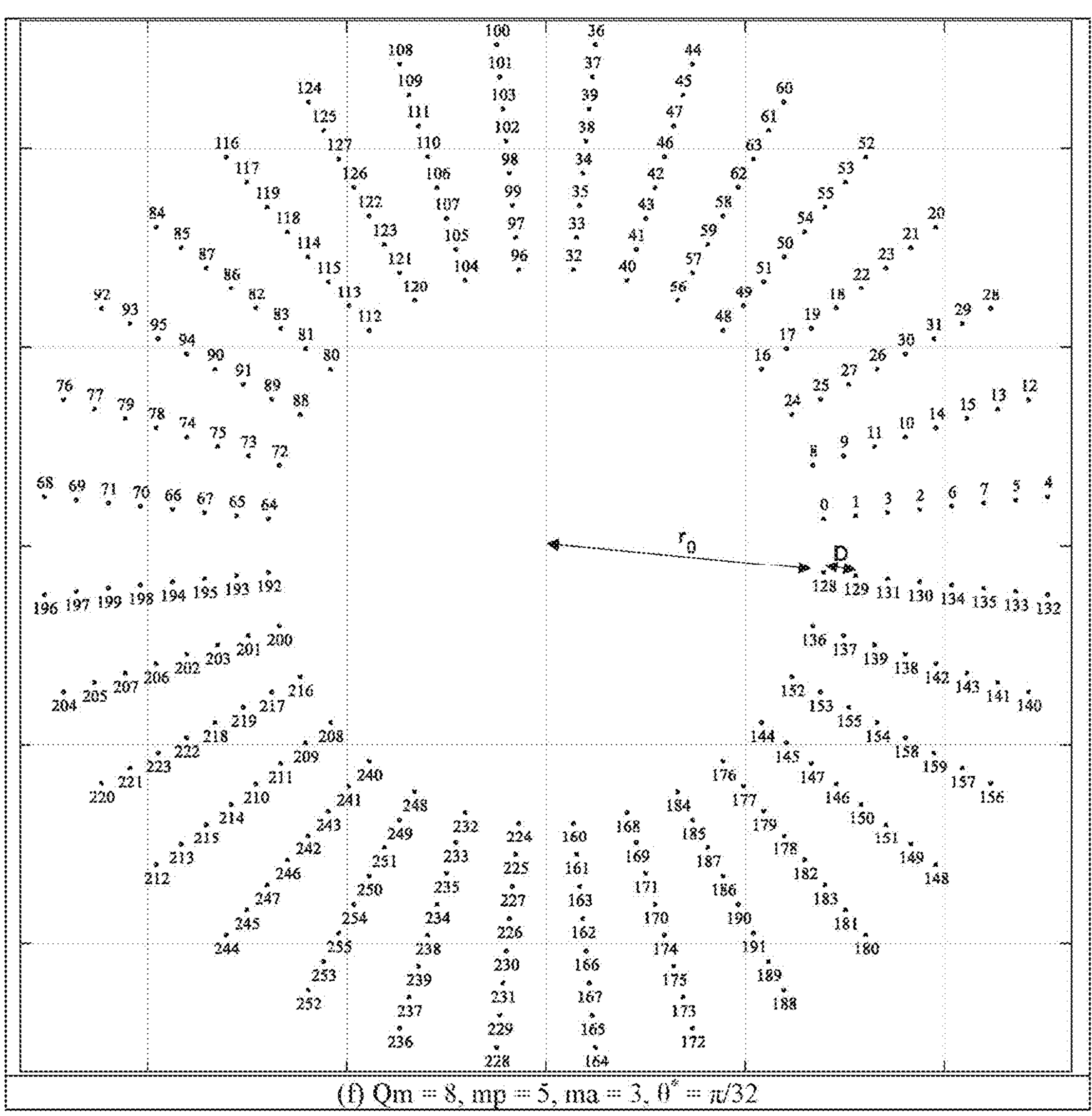

Embodiment Seven further illustrates the characteristics of RAPSK modulation scheme on the basis of any of the above embodiments. FIG. 4 depicts a schematic diagram showing a RAPSK modulation constellation according to an embodiment of the present disclosure. In this embodiment, the RAPSK modulation constellation as shown in FIG. 4 is taken as an example to illustrate RAPSK modulation.

The differences between this embodiment and any of the above embodiment lie in that, RAPSK modulation in this embodiment is a complex set of $2^{Q_m}$ elements with at least one of the following characteristics (where $Q_m$ denotes the modulation order of RAPSK modulation, the complex set is also called constellation, and the elements in the complex set are called constellation points):

(1) All constellation points fall on $Na=2^{ma}$ concentric rings and the radius of the i-th ring $r_i=r_0+i\cdot D$, i=0, 1, . . . , Na−1; where ma is the number of bits for amplitude mapping, $r_0$ is the radius of the 0th ring, i.e., the minimum radius, and D is the inter-ring distance. The minimum radius $r_0$ and the inter-ring distance D are both real numbers within the interval [0, 1].

(2) There are $Np=2^{mp}$ points on each ring, and the constellation points on the same ring are equidistant, that is, the phase difference between two adjacent constellation points is $$\frac{2\pi}{Np}=\frac{\pi}{2^{mp-1}},$$

where Np denotes number of RAPSK modulation phases, mp is the number of bits for phase mapping. mp is a function of modulation order Qm and the number of bits for amplitude mapping ma.

(3) The constellation points on all concentric rings have a common phase offset θ*, where θ* is real numbers, that is, the phases of the constellation points modulated by RAPSK are always taken from the set $$\left\{\frac{2\pi}{Np}\cdot k+\theta^* \,\middle|\, k=0,1,2,\ldots,Np-2,Np-1\right\}.$$

(4) The RAPSK modulated symbol is a function of at least one of the following parameters:

minimum radius $r_0$; inter-ring distance D; modulation order $Q_m$; number of bits for amplitude mapping ma; number of bits for phase mapping mp; number of concentric rings for RAPSK modulation Na; number of phase for RAPSK modulation $N_p$; or phase shift θ*.

(5) The RAPSK modulated symbol is within the following complex set:

$$\left\{(r_0+i\cdot D)\cdot\exp\left(j\cdot\left(\frac{2\pi}{Np}\cdot k+\theta^*\right)\right)\,\middle|\, i=0,1,\ldots,Na-1;k=0,1,\ldots,Np-1\right\},$$

where $j=\sqrt{-1}$ is the imaginary unit.

Alternatively, the complex set can also be expressed as:

$$\left\{(r_0+i\cdot D)\cdot\left[\cos\left(\frac{2\pi}{Np}\cdot k+\theta^*\right)+j\cdot\sin\left(\frac{2\pi}{Np}\cdot k+\theta^*\right)\right]\,\middle|\, i=0,1,\ldots,Na-1;k=0,1,\ldots,Np-1\right\},$$

where $j=\sqrt{-1}$ is the imaginary unit.

(6) RAPSK modulation includes a one-to-one mapping from $Q_m$ bits, $b_0$, $b_1$, $b_2$ . . . , $b_{Q_m-1}$ to $2^{Q_m}$ complex numbers, which is called the modulation mapping of RAPSK modulation. In this embodiment, the modulation mapping of RAPSK modulation is Gray mapping, in which, ma bits of the $Q_m$ bits, are utilized to determine the radii of the concentric ring for the constellation points (i.e., the amplitudes of the constellation points), and the other mp bits of the $Q_m$ bits are utilized to determine the phases of the constellation points. Therefore, ma is called the number of bits for amplitude mapping and mp is called the number of bits for phase mapping. Shown in FIG. 4 is an example of Gray mapping for RAPSK modulation, in which the number adjacent to each dot in FIG. 4 is obtained by its corresponding $Q_m$ bits $b_0$, $b_1$, $b_2$ . . . , $b_{Q_m-1}$ according to the equation $$\sum_{i=0}^{Qm-1}2^{Qm-1-i}\cdot b_i.$$

(7) The number bits for amplitude mapping ma is a function of the modulation order $Q_m$. The relationship between the number of bits for amplitude mapping and the modulation order is $ma=Q_m/2-1$. In particular, in the case of modulation order $Q_m$=4, the number of bits for amplitude mapping ma=1. In the case of modulation order $Q_m$=6, the number of bits for amplitude mapping ma=2. In the case of modulation order $Q_m$=8, the number of bits for amplitude mapping ma=3. In the case of modulation order $Q_m$=10, the number of bits for amplitude mapping ma=4.

(8) The relationship between the number of bits for phase mapping mp and the modulation order $Q_m$ and the number of bits for amplitude mapping ma can be mp=$Q_m$−ma.

(9) The number bits for phase mapping mp is a function of the modulation order $Q_m$. The relationship between the number of bits for phase mapping and the modulation order $Q_m$ can be mp=$Q_m$/2+1. In particular, in the case of modulation order $Q_m$=4, the number of bits for phase mapping mp=3. In the case of modulation order $Q_m$=6, the number of bits for phase mapping mp=4. In the case of modulation order $Q_m$=8, the number of bits for phase mapping mp=5. In the case of modulation order $Q_m$=10, the number of bits for phase mapping mp=6.

(10) The inter-ring distance D is a function of the minimum radius $r_0$ and the number of concentric rings Na in the constellation, and the relationship among them can be $$D = \frac{3r_0}{(2Na-1)} \cdot \left(\sqrt{1+\frac{2(1-r_0^2)(2\cdot Na-1)}{3r_0^2(Na-1)}}-1\right).$$

(11) The value range of the minimum radius $r_0$ is a function of the modulation order $Q_m$, and the relationship between them is as follows: $0.5 \le r_0 \le 0.7$ in the case of $Q_m$=4; $0.3 \le r_0 \le 0.5$ in the case of $Q_m$=6; $0.2 \le r_0 \le 0.4$ in the case of $Q_m$=8; and $0.1 \le r_0 \le 0.3$ in the case of $Q_m$=10.

(12) The value range of the inter-ring distance D is a function of the modulation order $Q_m$, and the relationship between them is as follows: $0.52<D<0.83$ in the case of $Q_m$=4; $0.29<D<0.40$ in the case of $Q_m$=6; $0.15<D<0.20$ in the case of $Q_m$=8; and $0.08<D<0.11$ in the case of $Q_m$=10.

Figure 5:
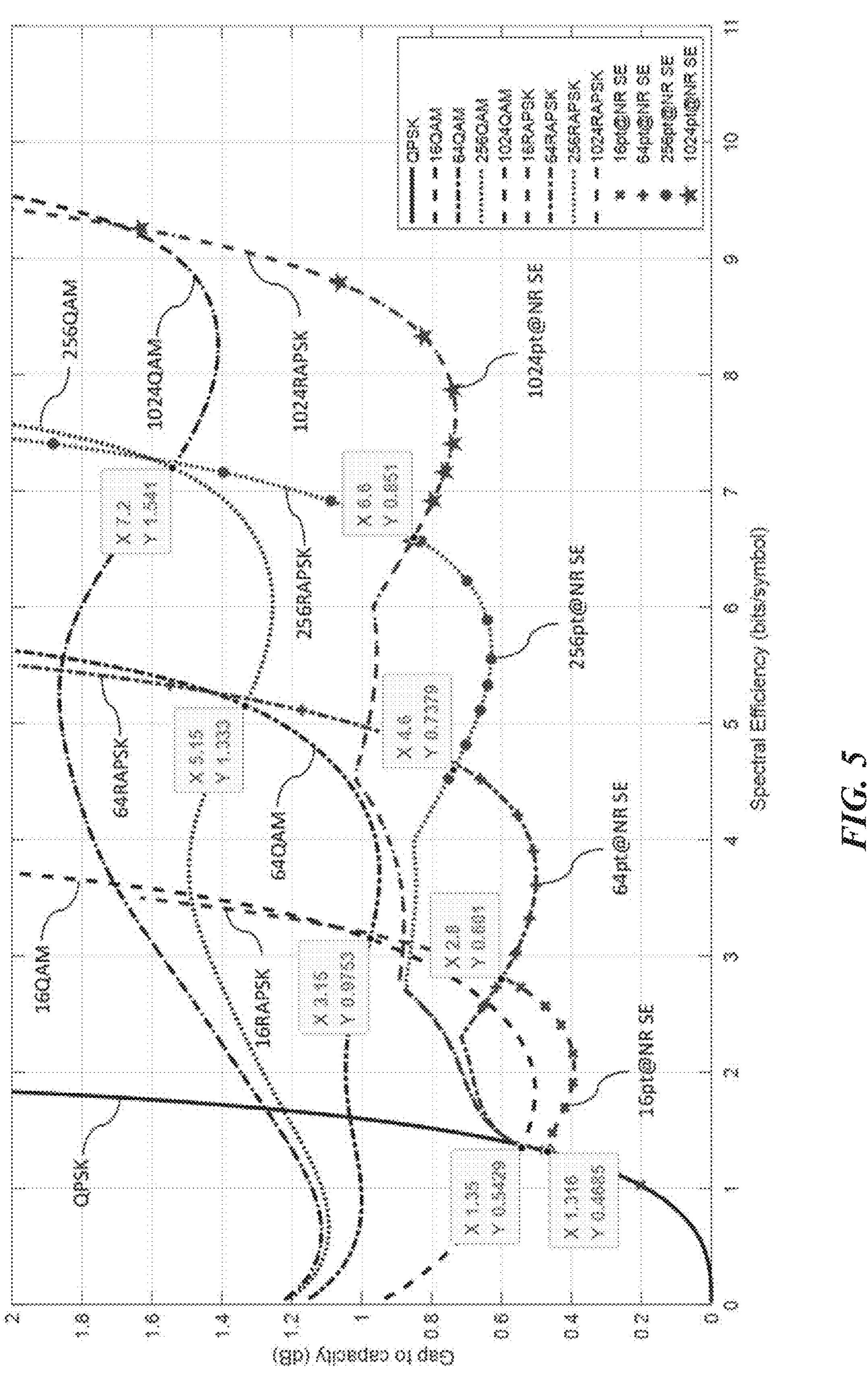
FIG. 5 depicts a schematic diagram showing the gap between the bit-level mutual information of RAPSK modulation, QPSK modulation and QAM modulation with different modulation orders and the Shannon limit.

FIG. 5 depicts a schematic diagram showing the gap between the bit-level mutual information of RAPSK modulation, QPSK modulation and QAM modulation with different modulation orders and the Shannon limit. As shown in FIG. 5, the gap between the bit-level mutual information of RAPSK modulation with Gray mapping, QPSK modulation and QAM modulation with different modulation orders and Shannon limit is given. As can be seen from FIG. 5, for RAPSK modulation with modulation order $Q_m$, the distance between RAPSK modulation and Shannon limit is significantly smaller than that of the distance between QAM modulation and Shannon limit when the spectral efficiency is less than $Q_m$−1.5, that is, the performance of the RAPSK is better.

In order to obtain greater shaping gain, the increase in spectral efficiency requires the increase in the modulation order of RAPSK modulation. Therefore, a spectral efficiency range is configured for different modulation orders in the MCS index table.

Meanwhile, for a given the spectral efficiency, different types of modulation and modulation order shall be selected to achieve better performance. The following embodiments discuss several examples of MCS index table obtained by appropriate selection for modulation and parameters thereof according to spectral efficiency.

Embodiment Eight provides Table 6 which is an MCS index table according to an embodiment of the present disclosure. Shown in Table 6 is an example MCS index table with the highest modulation order $Q_m$=8, QPSK and RAPSK combined and no reserved item.

This embodiment provides an example MCS index table based on any one of the Embodiments One to Four, Six and Seven. As shown in Table 6, the MCS index table is characterized by the following. First, in the MCS index table, the modulation order Qm corresponding to the highest spectral efficiency is 8. Second, in the MCS index table, the modulation order corresponding to RAPSK modulation scheme is Qm>2. Third, in the MCS index table, at least one set of parameters indicated by an MCS index value includes the following parameters: MCS index value, modulation order $Q_m$, minimum radius $r_0$, target coding rate R or R multiplied by a constant K (where K is a positive number), and spectrum efficiency. Fourth, in the MCS index table, the modulation scheme corresponding to the lowest spectral efficiency is QPSK modulation with the modulation order $Q_m$ is 2.

TABLE 6

An MCS index table

| MCS Index$I_{MCS}$ | Modulation Order $Q_m$ | Minimum Radius $r_0$ | Target code Rate R × [1024] | Spectral efficiency |
|---|---|---|---|---|
| 0 | 2 | — | 120 | 0.2344 |
| 1 | 2 | — | 157 | 0.3066 |
| 2 | 2 | — | 193 | 0.3770 |
| 3 | 2 | — | 251 | 0.4902 |
| 4 | 2 | — | 308 | 0.6016 |
| 5 | 2 | — | 379 | 0.7402 |
| 6 | 2 | — | 449 | 0.8770 |
| 7 | 2 | — | 526 | 1.0273 |
| 8 | 2 | — | 602 | 1.1758 |
| 9 | 2 | — | 679 | 1.3262 |
| 10 | 4 | 0.66 | 340 | 1.3281 |
| 11 | 4 | 0.60 | 378 | 1.4766 |
| 12 | 4 | 0.56 | 434 | 1.6953 |
| 13 | 4 | 0.54 | 490 | 1.9141 |
| 14 | 4 | 0.54 | 553 | 2.1602 |
| 15 | 4 | 0.55 | 616 | 2.4063 |
| 16 | 4 | 0.55 | 657 | 2.5664 |
| 17 | 4 | 0.56 | 699 | 2.7305 |
| 18 | 6 | 0.31 | 466 | 2.7305 |
| 19 | 6 | 0.32 | 517 | 3.0293 |
| 20 | 6 | 0.32 | 567 | 3.3223 |
| 21 | 6 | 0.33 | 616 | 3.6094 |
| 22 | 6 | 0.34 | 666 | 3.9023 |
| 23 | 6 | 0.35 | 719 | 4.2129 |
| 24 | 6 | 0.36 | 772 | 4.5234 |
| 25 | 8 | 0.22 | 616.5 | 4.8164 |
| 26 | 8 | 0.23 | 654.5 | 5.1133 |
| 27 | 8 | 0.23 | 682.5 | 5.3320 |
| 28 | 8 | 0.23 | 711 | 5.5547 |
| 29 | 8 | 0.23 | 754 | 5.8906 |
| 30 | 8 | 0.24 | 797 | 6.2266 |
| 31 | 8 | 0.25 | 841 | 6.5703 |

Embodiment Nine provides Table 7 which is another MCS index table according to an embodiment of the present disclosure. Shown in Table 7 is an example MCS index table with the highest modulation order $Q_m$=8, QPSK and RAPSK combined and reserved items.

This embodiment provides an example of MCS index table on the basis of any of the Embodiments One to Four, Six and Seven discussed above. As shown in Table 7, the differences between the MCS index table shown in Table 7 and the MCS index table shown in Table 6 lie in the following.

In the MCS index table, the MCS index value corresponding to the "reserved" item indicates the modulation scheme in the following manner.

First, the modulation scheme indicated by MCS index value of "reserved" item of modulation order $Q_m$=2 is the QPSK modulation.

Second, the modulation scheme indicated by the MCS index value of the "reserved" item with modulation order $Q_m$=4 is the RAPSK modulation with the minimum radius of a1, where a1 is constant which follows 0.5≤a1≤0.7.

Third, the modulation scheme indicated by the MCS index value of the "reserved" item with modulation order $Q_m$=6 is the RAPSK modulation with the minimum radius of a2, where a2 is constant which follows 0.3≤a2≤0.5.

Fourth, the modulation scheme indicated by the MCS index value of the "reserved" item with modulation order $Q_m$=8 is the RAPSK modulation with the minimum radius of a3, where a3 is constant which follows 0.2≤a3≤0.4.

TABLE 7

Another MCS Index Table

| MCS Index $I_{MCS}$ | Modulation Order $Q_m$ | Minimum Radius $r_0$ | Target code Rate R × [1024] | Spectral efficiency |
|---|---|---|---|---|
| 0 | 2 | — | 120 | 0.2344 |
| 1 | 2 | — | 157 | 0.3066 |
| 2 | 2 | — | 193 | 0.3770 |
| 3 | 2 | — | 251 | 0.4902 |
| 4 | 2 | — | 308 | 0.6016 |
| 5 | 2 | — | 379 | 0.7402 |
| 6 | 2 | — | 449 | 0.8770 |
| 7 | 2 | — | 526 | 1.0273 |
| 8 | 2 | — | 602 | 1.1758 |
| 9 | 2 | — | 679 | 1.3262 |
| 10 | 4 | 0.66 | 340 | 1.3281 |
| 11 | 4 | 0.60 | 378 | 1.4766 |
| 12 | 4 | 0.56 | 434 | 1.6953 |
| 13 | 4 | 0.54 | 490 | 1.9141 |
| 14 | 4 | 0.54 | 553 | 2.1602 |
| 15 | 4 | 0.55 | 616 | 2.4063 |
| 16 | 4 | 0.55 | 657 | 2.5664 |
| 17 | 6 | 0.31 | 466 | 2.7305 |
| 18 | 6 | 0.32 | 517 | 3.0293 |
| 19 | 6 | 0.32 | 567 | 3.3223 |
| 20 | 6 | 0.33 | 616 | 3.6094 |
| 21 | 6 | 0.34 | 666 | 3.9023 |
| 22 | 6 | 0.35 | 719 | 4.2129 |
| 23 | 6 | 0.36 | 772 | 4.5234 |
| 24 | 8 | 0.22 | 616.5 | 4.8164 |
| 25 | 8 | 0.23 | 654.5 | 5.1133 |
| 26 | 8 | 0.23 | 682.5 | 5.3320 |
| 27 | 8 | 0.23 | 711 | 5.5547 |
| 28 | 2 | — | reserved | |
| 29 | 4 | a1 | reserved | |
| 30 | 6 | a2 | reserved | |
| 31 | 8 | a3 | reserved | |

Embodiment 10 provides Table 8 which is another MCS index table according to an embodiment of the present disclosure. Shown in Table 8 is an example MCS index table with the highest modulation order $Q_m$=10, QPSK and RAPSK combined and reserved items.

This embodiment provides an example of MCS index table on the basis of any of the Embodiments One to Four, Six and Seven discussed above. As shown in Table 8, the differences between the MCS index table shown in Table 8 and the MCS index table shown in Table 7 lie in the following.

First, in the MCS index table, the modulation order $Q_m$ corresponding to the highest spectral efficiency is 10.

Second, in the MCS index table, at least one set of parameters indicated by MCS index value includes the following parameters: MCS index value; modulation order $Q_m$; inter-ring distance or radii differences of adjacent concentric rings, D; target coding rate R, or R multiplied by a constant K, where K is a positive number; and spectral efficiency.

Third, in the MCS index table, the MCS index value corresponding to the "reserved" item indicates the modulation scheme in the following manner.

1) The modulation scheme indicated by the MCS index value of "reserved" item of modulation order $Q_m$=2 is QPSK modulation.
2) The modulation scheme indicated by MCS index value of "reserved" item with modulation order $Q_m$=4 is RAPSK modulation with the inter-ring distance of D1, where D1 is constant, which follows 0.52<D1<0.83.
3) The modulation scheme indicated by MCS index value of "reserved" item with modulation order $Q_m$=6 is RAPSK modulation with the inter-ring distance of D2, where D2 is constant, which follows 0.29<D2<0.40.
4) The modulation scheme indicated by MCS index value of "reserved" item with modulation order $Q_m$=8 is RAPSK modulation with the inter-ring distance of D3, where D3 is constant, which follows 0.15<D3<0.20.
5) The modulation scheme indicated by MCS index value of "reserved" item with modulation order $Q_m$=10 is RAPSK modulation with the inter-ring distance of D4, where D4 is constant, which follows 0.08<D4<0.11.

TABLE 8

Another MCS Index Table

| MCS Index $I_{MCS}$ | Modulation Order $Q_m$ | Inter-Ring Distance D | Target code Rate R × [1024] | Spectral efficiency |
|---|---|---|---|---|
| 0 | 2 | — | 120 | 0.2344 |
| 1 | 2 | — | 193 | 0.3770 |
| 2 | 2 | — | 308 | 0.6016 |
| 3 | 2 | — | 449 | 0.8770 |
| 4 | 2 | — | 602 | 1.1758 |
| 5 | 4 | 0.6806 | 378 | 1.4766 |
| 6 | 4 | 0.7386 | 434 | 1.6953 |
| 7 | 4 | 0.7671 | 490 | 1.9141 |
| 8 | 4 | 0.7671 | 553 | 2.1602 |
| 9 | 4 | 0.7529 | 616 | 2.4063 |
| 10 | 4 | 0.7386 | 699 | 2.7305 |
| 11 | 6 | 0.3875 | 517 | 3.0293 |
| 12 | 6 | 0.3875 | 567 | 3.3223 |
| 13 | 6 | 0.3826 | 616 | 3.6094 |
| 14 | 6 | 0.3777 | 666 | 3.9023 |
| 15 | 6 | 0.3727 | 719 | 4.2129 |
| 16 | 6 | 0.3677 | 772 | 4.5234 |
| 17 | 8 | 0.1933 | 616.5 | 4.8164 |
| 18 | 8 | 0.1911 | 654.5 | 5.1133 |
| 19 | 8 | 0.1911 | 682.5 | 5.3320 |
| 20 | 8 | 0.1911 | 711 | 5.5547 |
| 21 | 8 | 0.1911 | 754 | 5.8906 |
| 22 | 8 | 0.1890 | 797 | 6.2266 |
| 23 | 8 | 0.1868 | 841 | 6.5703 |
| 24 | 10 | 0.0977 | 708 | 6.9141 |
| 25 | 10 | 0.0977 | 733 | 7.1582 |
| 26 | 10 | 0.0967 | 758.5 | 7.4072 |
| 27 | 2 | — | reserved | |
| 28 | 4 | D1 | reserved | |
| 29 | 6 | D2 | reserved | |
| 30 | 8 | D3 | reserved | |
| 31 | 10 | D4 | reserved | |

Embodiment Eleven provides Table 9 which is another MCS index table according to an embodiment of the present disclosure. Shown in Table 9 is an example MCS index table with the highest modulation order $Q_m$=6, π/2-BPSK, QPSK and RAPSK combined, and reserved items.

This embodiment provides an example of MCS index table on the basis of any of the Embodiments One to Four, Six and Seven discussed above. As shown in Table 9, the differences between the MCS index table shown in Table 9 and the MCS index table shown in Table 7 lie in the following.

First, in the MCS index table, the modulation order $Q_m$ corresponding to the highest spectral efficiency is 6.

Second, in the MCS index table, at least one set of parameters indicated by MCS index value includes the following parameters: MCS index value; modulation order $Q_m$; minimum radius $r_0$, inter-ring distance or radii differences of adjacent concentric rings, D; target coding rate R, or R multiplied by a constant K, where K is a positive number; and spectral efficiency.

Third, value q of the modulation order $Q_m$ indicated by some MCS index values in the MCS index table can be either 1 or 2.

Fourth, the modulation scheme indicated by MCS index value with modulation order $Q_m$=1 is π/2-BPSK modulation.

Fifth, the modulation scheme indicated by MCS index value with modulation order $Q_m$=2 is QPSK modulation.

Sixth, in the MCS index table, the MCS index value corresponding to the "reserved" item indicates the modulation scheme in the following manner.

The modulation scheme indicated by MCS index value of "reserved" item of modulation order $Q_m$=1 is π/2-BPSK modulation.

The modulation scheme indicated by MCS index value of "reserved" item of modulation order $Q_m$=2 is QPSK modulation.

The modulation scheme indicated by MCS index value of "reserved" item with modulation order $Q_m$=4 is RAPSK modulation with the minimum radius a1, and inter-ring distance of D1, where a1 and D1 are constants, which follow 0.5≤a1≤0.7, and 0.52<D1<0.83.

The modulation scheme indicated by MCS index value of "reserved" item with modulation order $Q_m$=6 is RAPSK modulation with the minimum radius a2, and inter-ring distance of D2, where a2 and D2 are constants, which follow 0.3≤a2≤0.5, and 0.29<D2<0.40.

TABLE 9

Another MCS Index Table

| MCS Index $I_{MCS}$ | Modulation Order $Q_m$ | Minimum Radius $r_0$ | Inter-ring Distance D | Target code Rate R × 1024 | Spectral efficiency |
|---|---|---|---|---|---|
| 0 | q | — | — | 60/q | 0.0586 |
| 1 | q | — | — | 80/q | 0.0781 |
| 2 | q | — | — | 100/q | 0.0977 |
| 3 | q | — | — | 128/q | 0.1250 |
| 4 | q | — | — | 156/q | 0.1523 |
| 5 | q | — | — | 198/q | 0.1934 |
| 6 | 2 | — | — | 120 | 0.2344 |
| 7 | 2 | — | — | 157 | 0.3066 |
| 8 | 2 | — | — | 193 | 0.3770 |
| 9 | 2 | — | — | 251 | 0.4902 |
| 10 | 2 | — | — | 308 | 0.6016 |
| 11 | 2 | — | — | 379 | 0.7402 |
| 12 | 2 | — | — | 449 | 0.8770 |
| 13 | 2 | — | — | 526 | 1.0273 |
| 14 | 2 | — | — | 602 | 1.1758 |
| 15 | 2 | — | — | 679 | 1.3262 |
| 16 | 4 | 0.60 | 0.6806 | 378 | 1.4766 |
| 17 | 4 | 0.56 | 0.7386 | 434 | 1.6953 |
| 18 | 4 | 0.54 | 0.7671 | 490 | 1.9141 |
| 19 | 4 | 0.54 | 0.7671 | 553 | 2.1602 |
| 20 | 4 | 0.55 | 0.7529 | 616 | 2.4063 |
| 21 | 4 | 0.55 | 0.7529 | 658 | 2.5703 |
| 22 | 4 | 0.56 | 0.7386 | 699 | 2.7305 |
| 23 | 6 | 0.32 | 0.3875 | 517 | 3.0293 |
| 24 | 6 | 0.32 | 0.3875 | 567 | 3.3223 |
| 25 | 6 | 0.33 | 0.3826 | 616 | 3.6094 |
| 26 | 6 | 0.34 | 0.3777 | 666 | 3.9023 |
| 27 | 6 | 0.36 | 0.3727 | 772 | 4.5234 |
| 28 | q | — | — | reserved | |
| 29 | 2 | — | — | reserved | |
| 30 | 4 | a1 | D1 | reserved | |
| 31 | 6 | a2 | D2 | reserved | |

Embodiment Twelve discusses Table 10, which is another MCS index table according to an embodiment of the present disclosure. As shown in Table 10, this MCS index table is an example of an MCS index table in which the highest modulation order $Q_m$=6, with QPSK, RAPSK and QAM combined, and reserved items.

This embodiment provides an example of MCS index table on the basis of any of the embodiments one to seven discussed above. As shown in Table 10, the differences between the MCS index table shown in Table 10 and the MCS index table shown in Table 9 lie in the following.

First, in the MCS index table, three MCS index values with modulation order $Q_m$=6, i.e., MCS index values 27, 28 and 31, indicate QAM modulation.

Second, the modulation scheme indicated by MCS index value 28 with the highest spectral efficiency is QAM modulation.

Third, MCS index values 27, 28 and 31 indicate modulation order $Q_m$=6 for QAM modulation, which is the largest modulation order throughout the MCS index table.

Fourth, in the MCS index table, at least one set of parameters indicated by MCS index value includes the following parameters: MCS index value; modulation order $Q_m$; number of concentric rings, Na; minimum radius $r_0$; target coding rate R, or R multiplied by a constant K, where K is a positive number; and spectrum efficiency.

Fifth, in the MCS index table, the MCS index value corresponding to the "reserved" item indicates the modulation scheme in the following manner.

The modulation scheme indicated by MCS index value of "reserved" item of modulation order $Q_m$=2 is QPSK modulation.

The modulation scheme indicated by the MCS index value of the "reserved" item with modulation order $Q_m$=4 is the RAPSK modulation with number of concentric rings, Na=2, and minimum radius of a1, where a1 is constant which follows 0.5≤a1≤0.7.

The modulation scheme indicated by MCS index value of "reserved" item of modulation order $Q_m$=6 is QAM modulation.

TABLE 10

Another MCS Index Table

| MCS Index $I_{MCS}$ | Modulation Order $Q_m$ | Number of Rings Na | Minimum Radius $r_0$ | Target code Rate R × [1024] | Spectral efficiency |
|---|---|---|---|---|---|
| 0 | 2 | — | — | 120 | 0.2344 |
| 1 | 2 | — | — | 157 | 0.3066 |
| 2 | 2 | — | — | 193 | 0.3770 |
| 3 | 2 | — | — | 251 | 0.4902 |
| 4 | 2 | — | — | 308 | 0.6016 |
| 5 | 2 | — | — | 379 | 0.7402 |
| 6 | 2 | — | — | 449 | 0.8770 |
| 7 | 2 | — | — | 526 | 1.0273 |
| 8 | 2 | — | — | 602 | 1.1758 |
| 9 | 2 | — | — | 679 | 1.3262 |
| 10 | 4 | 2 | 0.66 | 340 | 1.3281 |
| 11 | 4 | 2 | 0.60 | 378 | 1.4766 |
| 12 | 4 | 2 | 0.56 | 434 | 1.6953 |
| 13 | 4 | 2 | 0.54 | 490 | 1.9141 |
| 14 | 4 | 2 | 0.54 | 553 | 2.1602 |
| 15 | 4 | 2 | 0.55 | 616 | 2.4063 |
| 16 | 4 | 2 | 0.56 | 658 | 2.5703 |
| 17 | 6 | 4 | 0.32 | 438 | 2.5664 |
| 18 | 6 | 4 | 0.31 | 466 | 2.7305 |
| 19 | 6 | 4 | 0.32 | 517 | 3.0293 |
| 20 | 6 | 4 | 0.32 | 567 | 3.3223 |
| 21 | 6 | 4 | 0.33 | 616 | 3.6094 |
| 22 | 6 | 4 | 0.34 | 666 | 3.9023 |
| 23 | 6 | 4 | 0.35 | 719 | 4.2129 |
| 24 | 6 | 4 | 0.36 | 772 | 4.5234 |
| 25 | 6 | 4 | 0.37 | 822 | 4.8164 |
| 26 | 6 | 4 | 0.40 | 873 | 5.1152 |
| 27 | 6 | — | — | 910 | 5.3320 |
| 28 | 6 | — | — | 948 | 5.5547 |
| 29 | 2 | — | — | reserved | |
| 30 | 4 | 2 | a1 | reserved | |
| 31 | 6 | — | — | reserved | |

Embodiment Thirteen discusses Table 11, which is another MCS index table according to an embodiment of the present disclosure. As shown in Table 11, this MCS index table is an example of an MCS index table in which the highest modulation order $Q_m$=10, with QPSK, RAPSK and QAM combined, and reserved items.

This embodiment provides an example of MCS index table on the basis of any of the embodiments one to seven discussed above. As shown in Table 11, the differences between the MCS index table shown in Table 11 and the MCS index table shown in Table 10 lie in the following.

First, in the MCS index table, the modulation order $Q_m$ corresponding to the highest spectral efficiency is 10.

Second, in the MCS index table, two MCS index values with modulation order $Q_m$=10, i.e., MCS index values 26 and 31, indicate QAM modulation.

Third, the modulation scheme indicated by MCS index value 26 with the highest spectral efficiency is QAM modulation.

Fourth, MCS index values 26 and 31 indicate modulation order $Q_m$=10 for QAM modulation, which is the largest modulation order throughout the MCS index table.

Fifth, in the MCS index table, at least one set of parameters indicated by MCS index value includes the following parameters: MCS index value; modulation order $Q_m$; number of points on each concentric ring, or different phase numbers on the concentric rings, Np; minimum radius $r_0$; target coding rate R, or R multiplied by a constant K, where K is a positive number; and spectral efficiency.

Sixth, in the MCS index table, the MCS index value corresponding to the "reserved" item indicates the modulation scheme in the following manner.

The modulation scheme indicated by MCS index value of "reserved" item of modulation order $Q_m$=2 is QPSK modulation.

The modulation scheme indicated by the MCS index value of the "reserved" item with modulation order $Q_m$=4 is the RAPSK modulation with different number of phase on the concentric rings, Np=8, and minimum radius of a1, where a1 is constant which follows 0.5≤a1≤0.7.

The modulation scheme indicated by the MCS index value of the "reserved" item with modulation order $Q_m$=6 is the RAPSK modulation with different number of phase on the concentric rings, Np=16, and minimum radius of a2, where a2 is constant which follows 0.3≤a2≤0.5.

The modulation scheme indicated by the MCS index value of the "reserved" item with modulation order $Q_m$=8 is the RAPSK modulation with different number of phase on the concentric rings, Np=32, and minimum radius of a3, where a3 is constant which follows 0.2≤a3≤0.4.

The modulation scheme indicated by MCS index value of "reserved" item of modulation order $Q_m$=10 is QAM modulation.

TABLE 11

Another MCS Index Table

| MCS Index $I_{MCS}$ | Modulation Order $Q_m$ | Number of Phases Np | Minimum Radius $r_0$ | Target code Rate R × [1024] | Spectral efficiency |
|---|---|---|---|---|---|
| 0 | 2 | — | — | 120 | 0.2344 |
| 1 | 2 | — | — | 193 | 0.3770 |
| 2 | 2 | — | — | 308 | 0.6016 |
| 3 | 2 | — | — | 449 | 0.8770 |
| 4 | 2 | — | — | 602 | 1.1758 |
| 5 | 4 | 8 | 0.60 | 378 | 1.4766 |
| 6 | 4 | 8 | 0.54 | 490 | 1.9141 |
| 7 | 4 | 8 | 0.55 | 616 | 2.4063 |
| 8 | 4 | 8 | 0.56 | 699 | 2.7305 |
| 9 | 6 | 16 | 0.32 | 567 | 3.3223 |
| 10 | 6 | 16 | 0.34 | 666 | 3.9023 |
| 11 | 6 | 16 | 0.35 | 719 | 4.2129 |
| 12 | 6 | 16 | 0.36 | 772 | 4.5234 |
| 13 | 8 | 32 | 0.22 | 616.5 | 4.8164 |
| 14 | 8 | 32 | 0.23 | 654.5 | 5.1133 |
| 15 | 8 | 32 | 0.23 | 682.5 | 5.3320 |
| 16 | 8 | 32 | 0.23 | 711 | 5.5547 |
| 17 | 8 | 32 | 0.23 | 754 | 5.8906 |
| 18 | 8 | 32 | 0.24 | 797 | 6.2266 |
| 19 | 8 | 32 | 0.25 | 841 | 6.5703 |
| 20 | 10 | 64 | 0.16 | 708 | 6.9141 |
| 21 | 10 | 64 | 0.16 | 733 | 7.1582 |
| 22 | 10 | 64 | 0.17 | 758.5 | 7.4072 |
| 23 | 10 | 64 | 0.17 | 806 | 7.8711 |
| 24 | 10 | 64 | 0.19 | 853 | 8.3321 |
| 25 | 10 | 64 | 0.21 | 900.5 | 8.7939 |
| 26 | 10 | — | — | 948 | 9.2578 |
| 27 | 2 | — | — | reserved | |
| 28 | 4 | 8 | a1 | reserved | |
| 29 | 6 | 16 | a2 | reserved | |
| 30 | 8 | 32 | a3 | reserved | |
| 31 | 10 | — | — | reserved | |

Embodiment Fourteen provides Table 12 which is another MCS index table according to an embodiment of the present disclosure. As shown in Table 12, this MCS index table is an example of an MCS index table in which the highest modulation order $Q_m$=10, with QPSK, RAPSK and QAM combined, and reserved items.

This embodiment provides an example of MCS index table on the basis of any of the embodiments one to seven discussed above. As shown in Table 12, the differences between the MCS index table shown in Table 12 and the MCS index table shown in Table 11 lie in the following.

First, in the MCS index table, at least one set of parameters indicated by MCS index value includes the following parameters: MCS index value; modulation order $Q_m$; number of bits for phase mapping, mp; minimum radius $r_0$; target coding rate R, or R multiplied by a constant K, where K is a positive number; and spectrum efficiency.

Second, in the MCS index table, the MCS index value corresponding to the "reserved" item indicates the modulation scheme in the following manner.

The modulation scheme indicated by MCS index value of "reserved" item of modulation order $Q_m=2$ is QPSK modulation.

The modulation scheme indicated by the MCS index value of the "reserved" item with modulation order $Q_m=4$ is the RAPSK modulation with number of bits for phase mapping, mp=3, and minimum radius of a1, where a1 is constant which follows 0.5≤a1≤0.7.

The modulation scheme indicated by the MCS index value of the "reserved" item with modulation order $Q_m=6$ is the RAPSK modulation with number of bits for phase mapping, mp=4, and minimum radius of a2, where a2 is constant which follows 0.3≤a2≤0.5.

The modulation scheme indicated by the MCS index value of the "reserved" item with modulation order $Q_m=8$ is the RAPSK modulation with number of bits for phase mapping, mp=5, and minimum radius of a3, where a3 is constant which follows 0.2≤a3≤0.4.

The modulation scheme indicated by MCS index value of "reserved" item of modulation order $Q_m=10$ is QAM modulation.

TABLE 12

Another MCS Index Table

| MCS Index $I_{MCS}$ | Modulation Order $Q_m$ | number of bits for phase mapping mp | Minimum Radius $r_0$ | Target code Rate R × [1024] | Spectral efficiency |
|---|---|---|---|---|---|
| 0 | 2 | — | — | 120 | 0.2344 |
| 1 | 2 | — | — | 193 | 0.3770 |
| 2 | 2 | — | — | 308 | 0.6016 |
| 3 | 2 | — | — | 449 | 0.8770 |
| 4 | 2 | — | — | 602 | 1.1758 |
| 5 | 4 | 3 | 0.60 | 378 | 1.4766 |
| 6 | 4 | 3 | 0.54 | 490 | 1.9141 |
| 7 | 4 | 3 | 0.55 | 616 | 2.4063 |
| 8 | 4 | 3 | 0.56 | 699 | 2.7305 |
| 9 | 6 | 4 | 0.32 | 567 | 3.3223 |
| 10 | 6 | 4 | 0.34 | 666 | 3.9023 |
| 11 | 6 | 4 | 0.35 | 719 | 4.2129 |
| 12 | 6 | 4 | 0.36 | 772 | 4.5234 |
| 13 | 8 | 5 | 0.22 | 616.5 | 4.8164 |
| 14 | 8 | 5 | 0.23 | 654.5 | 5.1133 |
| 15 | 8 | 5 | 0.23 | 682.5 | 5.3320 |
| 16 | 8 | 5 | 0.23 | 711 | 5.5547 |
| 17 | 8 | 5 | 0.23 | 754 | 5.8906 |
| 18 | 8 | 5 | 0.24 | 797 | 6.2266 |
| 19 | 8 | 5 | 0.25 | 841 | 6.5703 |
| 20 | 10 | 6 | 0.16 | 708 | 6.9141 |
| 21 | 10 | 6 | 0.16 | 733 | 7.1582 |
| 22 | 10 | 6 | 0.17 | 758.5 | 7.4072 |
| 23 | 10 | 6 | 0.17 | 806 | 7.8711 |
| 24 | 10 | 6 | 0.19 | 853 | 8.3321 |
| 25 | 10 | 6 | 0.21 | 900.5 | 8.7939 |
| 26 | 10 | — | — | 948 | 9.2578 |
| 27 | 2 | — | — | reserved | |
| 28 | 4 | 3 | a1 | reserved | |
| 29 | 6 | 4 | a2 | reserved | |
| 30 | 8 | 5 | a3 | reserved | |
| 31 | 10 | — | — | reserved | |

In Embodiment Fifteen, the RAPSK modulation mapping scheme indicates the scheme in which every $Q_m$ successive bits of a bit sequence for $f_0$, $f_1$, $f_2$ . . . , $f_{E-1}$, i.e., $[b_0, b_1, b_2 \ldots, b_{Q_m-1}]=[f_{k\cdot Qm}, f_{1+k\cdot Qm}, f_{2+k\cdot Qm}, \ldots f_{Qm-1+k\cdot Qm}]$ (k=0, 1, . . . , $E/Q_m-1$) are mapped into a complex modulation symbol $x=x_k$. The modulation map scheme can be one of limited and predefined modulation symbol schemes. For example, shown in Table 13 is a schematic table showing two different 4-bit modulation mapping schemes, which can correspond to some or all bit mapping in each modulation symbol in RAPSK modulation. For another example, shown in Table 14 is a schematic table showing two different 6-bit modulation mapping schemes, which can correspond to some or all bit mappings in each modulation symbol in RAPSK modulation, where "i" in the table denotes the serial number of RAPSK modulation concentric rings and "k" denotes the serial number of the phase of RAPSK modulation on the same ring.

In an embodiment, each of the predefined modulation mapping schemes can be expressed by an equation. In an example, the predefined modulation mapping scheme as shown in Table 13(a) can be expressed by the following equation:

$$x = \left(r_0 + b_0 \cdot \left(\sqrt{2 - r_0^2} - r_0\right)\right) \cdot \exp\left(j \cdot \left(\frac{\pi}{8} \cdot [7 - (1 - 2b_1)[4 - (2b_2 - 1)[2 - (2b_3 - 1)]]]\right)\right);$$

where $r_0$ is the minimum radius.

Table 15 depicts another MCS index table according to an embodiment of the present disclosure. Shown in Table 15 is an example MCS index table with the highest modulation order $Q_m=6$, and QPSK and RAPSK combined.

This embodiment provides an example of MCS index table on the basis of any of the Embodiments One to Four, Six and Seven discussed above. As shown in Table 15, the differences between the MCS index table shown in Table 15 and the MCS index table shown in Table 9 lie in the following.

First, in the MCS index table, at least one set of parameters indicated by MCS index value includes the following parameters: MCS index value; modulation order $Q_m$; minimum radius $r_0$; RAPSK modulation mapping scheme; target coding rate R, or R multiplied by a constant K, where K is a positive number; and spectral efficiency.

Second, in the MCS index table, the MCS index value corresponding to the "reserved" item indicates the modulation scheme in the following manner.

The modulation scheme indicated by MCS index value of "reserved" item of modulation order Qm=2 is QPSK modulation.

The modulation scheme indicated by the MCS index value of the "reserved" item with modulation order $Q_m=4$ is the RAPSK modulation with the minimum radius of a1, and RAPSK modulation mapping of Table 13(b), where a1 is constant which follows 0.5≤a1≤0.7.

The modulation scheme indicated by the MCS index value of the "reserved" item with modulation order $Q_m=6$ is the RAPSK modulation with the minimum radius of a2, and RAPSK modulation mapping of Table 14(b), where a2 is constant which follows 0.3≤a2≤0.5.

TABLE 13

| Schematic table showing two different 4-bit modulation mapping | | | |
|---|---|---|---|
| Ring index i | Phase index k | (a) $b_0b_1b_2b_3$ | (b) $b_0b_1b_2b_3$ |
| 0 | 0 | 0000 | 0111 |
| 0 | 1 | 0001 | 0110 |
| 0 | 2 | 0011 | 0100 |
| 0 | 3 | 0010 | 0101 |
| 0 | 4 | 0110 | 0001 |
| 0 | 5 | 0111 | 0000 |
| 0 | 6 | 0101 | 0010 |
| 0 | 7 | 0100 | 0011 |
| 1 | 0 | 1000 | 1111 |
| 1 | 1 | 1001 | 1110 |
| 1 | 2 | 1011 | 1100 |
| 1 | 3 | 1010 | 1101 |
| 1 | 4 | 1110 | 1001 |
| 1 | 5 | 1111 | 1000 |
| 1 | 6 | 1101 | 1010 |
| 1 | 7 | 1100 | 1011 |

TABLE 14

| Schematic table showing two different 6-bit modulation mapping | | | | | | | |
|---|---|---|---|---|---|---|---|
| Ring index i | Phase index k | (a) $b_0b_1b_2b_3b_4b_5$ | (b) $b_0b_1b_2b_3b_4b_5$ | Ring index i | Phase index k | (a) $b_0b_1b_2b_3b_4b_5$ | (b) $b_0b_1b_2b_3b_4b_5$ |
| 0 | 0 | 000000 | 011111 | 2 | 0 | 110000 | 101111 |
| 0 | 1 | 000001 | 011110 | 2 | 1 | 110001 | 101110 |
| 0 | 2 | 000011 | 011100 | 2 | 2 | 110011 | 101100 |
| 0 | 3 | 000010 | 011101 | 2 | 3 | 110010 | 101101 |
| 0 | 4 | 000110 | 011001 | 2 | 4 | 110110 | 101001 |
| 0 | 5 | 000111 | 011000 | 2 | 5 | 110111 | 101000 |
| 0 | 6 | 000101 | 011010 | 2 | 6 | 110101 | 101010 |
| 0 | 7 | 000100 | 011011 | 2 | 7 | 110100 | 101011 |
| 0 | 8 | 001100 | 010011 | 2 | 8 | 111100 | 100011 |
| 0 | 9 | 001101 | 010010 | 2 | 9 | 111101 | 100010 |
| 0 | 10 | 001111 | 010000 | 2 | 10 | 111111 | 100000 |
| 0 | 11 | 001110 | 010001 | 2 | 11 | 111110 | 100001 |
| 0 | 12 | 001010 | 010101 | 2 | 12 | 111010 | 100101 |
| 0 | 13 | 001011 | 010100 | 2 | 13 | 111011 | 100100 |
| 0 | 14 | 001001 | 010110 | 2 | 14 | 111001 | 100110 |
| 0 | 15 | 001000 | 010111 | 2 | 15 | 111000 | 100111 |
| 1 | 0 | 010000 | 001111 | 3 | 0 | 100000 | 111111 |
| 1 | 1 | 010001 | 001110 | 3 | 1 | 100001 | 111110 |
| 1 | 2 | 010011 | 001100 | 3 | 2 | 100011 | 111100 |
| 1 | 3 | 010010 | 001101 | 3 | 3 | 100010 | 111101 |
| 1 | 4 | 010110 | 001001 | 3 | 4 | 100110 | 111001 |
| 1 | 5 | 010111 | 001000 | 3 | 5 | 100111 | 111000 |
| 1 | 6 | 010101 | 001010 | 3 | 6 | 100101 | 111010 |
| 1 | 7 | 010100 | 001011 | 3 | 7 | 100100 | 111011 |
| 1 | 8 | 011100 | 000011 | 3 | 8 | 101100 | 110011 |
| 1 | 9 | 011101 | 000010 | 3 | 9 | 101101 | 110010 |
| 1 | 10 | 011111 | 000000 | 3 | 10 | 101111 | 110000 |
| 1 | 11 | 011110 | 000001 | 3 | 11 | 101110 | 110001 |
| 1 | 12 | 011010 | 000101 | 3 | 12 | 101010 | 110101 |
| 1 | 13 | 011011 | 000100 | 3 | 13 | 101011 | 110100 |
| 1 | 14 | 011001 | 000110 | 3 | 14 | 101001 | 110110 |
| 1 | 15 | 011000 | 000111 | 3 | 15 | 101000 | 110111 |

TABLE 15

| Another MCS Index Table | | | | | |
|---|---|---|---|---|---|
| MCS Index $I_{MCS}$ | Modulation Order $Q_m$ | Minimum Radius $r_0$ | Modulation Mapping | Target code Rate R × [1024] | Spectral efficiency |
| 0 | 2 | — | — | 30 | 0.0586 |
| 1 | 2 | — | — | 40 | 0.0781 |
| 2 | 2 | — | — | 50 | 0.0977 |
| 3 | 2 | — | — | 64 | 0.1250 |

TABLE 15-continued

| Another MCS Index Table | | | | | |
|---|---|---|---|---|---|
| MCS Index $I_{MCS}$ | Modulation Order $Q_m$ | Minimum Radius $r_0$ | Modulation Mapping | Target code Rate R × [1024] | Spectral efficiency |
| 4 | 2 | — | — | 78 | 0.1523 |
| 5 | 2 | — | — | 99 | 0.1934 |
| 6 | 2 | — | — | 120 | 0.2344 |
| 7 | 2 | — | — | 157 | 0.3066 |
| 8 | 2 | — | — | 193 | 0.3770 |
| 9 | 2 | — | — | 251 | 0.4902 |
| 10 | 2 | — | — | 308 | 0.6016 |
| 11 | 2 | — | — | 379 | 0.7402 |
| 12 | 2 | — | — | 449 | 0.8770 |
| 13 | 2 | — | — | 526 | 1.0273 |
| 14 | 2 | — | — | 602 | 1.1758 |
| 15 | 4 | 0.66 | Table 13 (a) | 340 | 1.3281 |
| 16 | 4 | 0.60 | Table 13 (a) | 378 | 1.4766 |
| 17 | 4 | 0.56 | Table 13 (b) | 434 | 1.6953 |
| 18 | 4 | 0.54 | Table 13 (b) | 490 | 1.9141 |
| 19 | 4 | 0.54 | Table 13 (b) | 553 | 2.1602 |

TABLE 15-continued

| Another MCS Index Table | | | | | |
|---|---|---|---|---|---|
| MCS Index $I_{MCS}$ | Modulation Order $Q_m$ | Minimum Radius $r_0$ | Modulation Mapping | Target code Rate R × [1024] | Spectral efficiency |
| 20 | 4 | 0.55 | Table 13 (b) | 616 | 2.4063 |
| 21 | 4 | 0.55 | Table 13 (b) | 438 | 2.5664 |
| 22 | 4 | 0.56 | Table 13 (b) | 699 | 2.7305 |
| 23 | 6 | 0.32 | Table 14 (a) | 517 | 3.0293 |

TABLE 15-continued

| Another MCS Index Table | | | | | |
|---|---|---|---|---|---|
| MCS Index $I_{MCS}$ | Modulation Order $Q_m$ | Minimum Radius $r_0$ | Modulation Mapping | Target code Rate R × [1024] | Spectral efficiency |
| 24 | 6 | 0.32 | Table 14 (a) | 567 | 3.3223 |
| 25 | 6 | 0.33 | Table 14 (b) | 616 | 3.6094 |
| 26 | 6 | 0.34 | Table 14 (b) | 666 | 3.9023 |
| 27 | 6 | 0.35 | Table 14 (b) | 719 | 4.2129 |
| 28 | 6 | 0.35 | Table 14 (b) | 772 | 4.5234 |
| 29 | 2 | — | — | reserved | |
| 30 | 4 | a1 | Table 13 (b) | reserved | |
| 31 | 6 | a2 | Table 14 (b) | reserved | |

Figure 6:
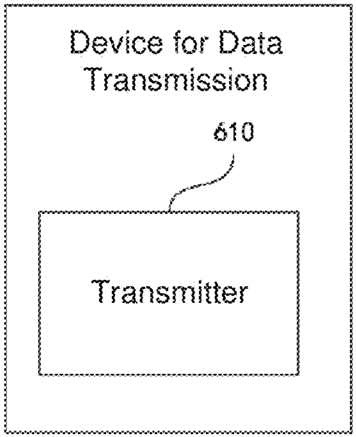
FIG. 6 depicts a schematic diagram showing a device for data transmission according to an embodiment of the present disclosure.

FIG. 6 depicts a schematic block diagram showing a device for data transmission according to an embodiment of the present disclosure. This embodiment is directed to a device for data transmission. The device for data transmission is a first communication node. As shown in FIG. 6, the device in this embodiment includes a transmitter 610.

The transmitter 610 is configured to transmit an MCS index value to the second communication node.

The MCS index value is indicative of one group of parameters in an MCS index table. The modulation scheme corresponding to at least one group of parameters in the MCS index table is RAPSK modulation.

The device for data transmission according to this embodiment is configured to perform the method for data transmission applied to the first communication node as described with respect to FIG. 2, with similar scheme and technical effects, and which will not be repeated here.

In an embodiment, the MCS index table includes at least one of, MCS index values; modulation order; target code rate; spectrum efficiency; number of concentric rings; number of constellation points on each concentric ring or different modulation phases on each concentric ring; number of bits for amplitude mapping; number of bits for phase mapping; minimum radius; inter-ring distance; or RAPSK modulation mapping scheme.

In an embodiment, the modulation scheme corresponding to at least one MCS index value in the MCS index table is QAM modulation.

In an embodiment, in the MCS index table, the modulation order of the QAM modulation is the maximum modulation order in the MCS index table.

In an embodiment, the modulation scheme corresponding to the maximum spectral efficiency in the MCS index table is QAM modulation.

In an embodiment, in the MCS index table, when the modulation order is “4”, the spectral efficiency corresponding to the RAPSK modulation scheme is greater than 1.3 and less than 3.1.

In an embodiment, in the MCS index table, when the modulation order is “6”, the spectral efficiency corresponding to the RAPSK modulation scheme is greater than 2.5 and less than 5.2.

In an embodiment, in the MCS index table, when the modulation order is “8”, the spectral efficiency corresponding to the RAPSK modulation scheme is greater than 4.5 and less than 7.1.

In an embodiment, in the MCS index table, when the modulation order is “10”, the spectral efficiency corresponding to the RAPSK modulation scheme is greater than 6.5 and less than 9.3.

In an embodiment, the RAPSK modulation includes RAPSK with Gray mapping.

Figure 7:
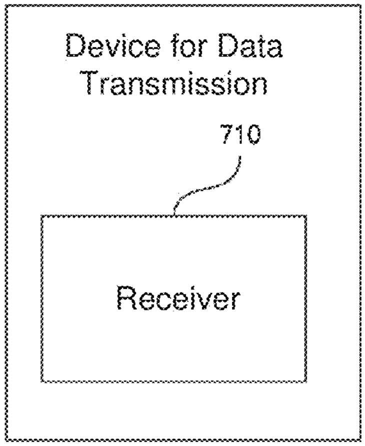
FIG. 7 depicts a schematic diagram showing a device for data transmission according to another embodiment of the present disclosure.

FIG. 7 depicts a schematic block diagram showing a device for data transmission according to another embodiment of the present disclosure. This embodiment is directed to a device for data transmission. The device for data transmission is a second communication node. As shown in FIG. 7, the device in this embodiment includes a receiver 710.

The receiver 710 is configured to receive an MCS index value sent by a first communication node.

The MCS index value is indicative of one group of parameters in an MCS index table. The modulation corresponding to at least one group of parameters in the MCS index table is RAPSK modulation.

The device for data transmission according to this embodiment is configured to perform the method for data transmission applied to the second communication node as described with respect to FIG. 3, with similar scheme and technical effects, and which will not be repeated here.

In an embodiment, the MCS index table includes at least one of, MCS index values; modulation order; target code rate; spectrum efficiency; number of concentric rings; number of constellation points on each concentric ring or different modulation phases on each concentric ring; number of bits for amplitude mapping; number of bits for phase mapping; minimum radius; inter-ring distance; or RAPSK modulation mapping scheme.

In an embodiment, the modulation scheme corresponding to at least one MCS index value in the MCS index table is QAM modulation.

In an embodiment, in the MCS index table, the modulation order of the QAM modulation is the maximum modulation order in the MCS index table.

In an embodiment, the modulation scheme corresponding to the maximum spectral efficiency in the MCS index table is QAM modulation.

In an embodiment, in the MCS index table, when the modulation order is “4”, the spectral efficiency corresponding to the RAPSK modulation scheme is greater than 1.3 and less than 3.1.

In an embodiment, in the MCS index table, when the modulation order is “6”, the spectral efficiency corresponding to the RAPSK modulation scheme is greater than 2.5 and less than 5.2.

In an embodiment, in the MCS index table, when the modulation order is “8”, the spectral efficiency corresponding to the RAPSK modulation scheme is greater than 4.5 and less than 7.1.

In an embodiment, in the MCS index table, when the modulation order is “10”, the spectral efficiency corresponding to the RAPSK modulation scheme is greater than 6.5 and less than 9.3.

In an embodiment, the RAPSK modulation includes RAPSK with Gray mapping.

Figure 8:
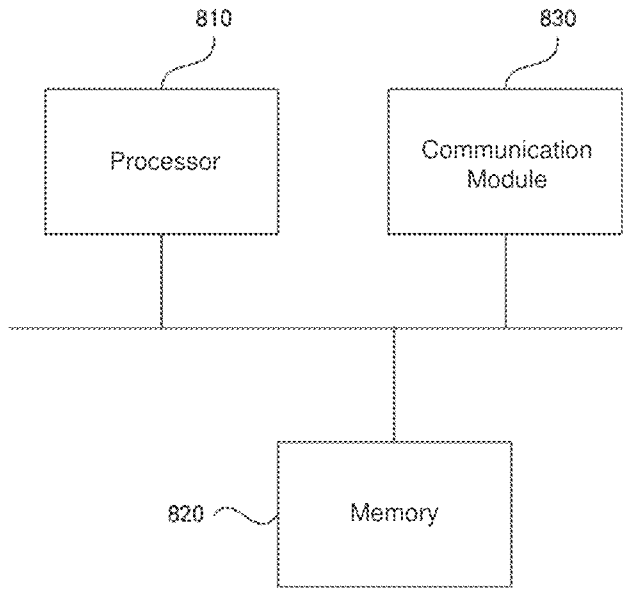
FIG. 8 depicts a schematic block diagram showing an apparatus for data transmission according to an embodiment of the present disclosure.

FIG. 8 depicts a schematic block diagram showing an apparatus for data transmission according to an embodiment of the present disclosure. As shown in FIG. 8, the apparatus includes a processor 810, a memory 820, and a communication module 830. The apparatus may be provided with one or more processors 810, while FIG. 8 shows one by way of example. One or more memory 820 may be provided within the apparatus, while FIG. 8 shows one by way of example. Processor 810, memory 820 and communication module 830 can be connected by a bus or other means. The connection is shown as bus by way of an example in FIG. 8. In this embodiment, the apparatus can be a base station.

As a computer-readable storage medium, memory 820 may be configured to store software programs, computer-executable programs and modules, such as program instructions/modules corresponding to the device for data transmission as described in any one of the embodiments of the present disclosure, such as the transmitter 610 in the device for data transmission. The memory 820 may generally include a program storage section and a data storage section, in which the program storage section may store an operating system and application programs for performing at least one operation, and data storage section may store data created according to the operation of the apparatus, or the like. In addition, the memory 820 can include a high-speed random access memory and a nonvolatile memory, such as at least one disk memory device, a flash memory device, or other nonvolatile solid-state memory devices. In some implementations, the memory 820 may include memories remotely located relative to the processor 810, and these remote memories may be connected to the apparatus through a network. Examples of the above networks include, but are not limited to, the Internet, intranet, local area network, mobile communication network, and combinations thereof.

The communication module 830 is configured to perform communication interaction between a first communication node and a second communication node.

In a case where the device for data transmission is the first communication node, the provided device can be configured to performed the method for data transmission method applied to the first communication node according to any of the above embodiments, and has corresponding functions and effects.

In a case where the device for data transmission is the second communication node, the provided device can be configured to performed the method for data transmission method applied to the second communication node according to any of the above embodiments, and has corresponding functions and effects.

An embodiment of the present disclosure further provides a storage medium containing a computer-executable instruction which, when executed by a computer processor, causes the processor to carry out the method for data transmission applied to a first communication node, the method includes, sending a modulation and coding scheme (MCS) index value to a second communication node, where the MCS index value is indicative of one of a plurality sets of parameters in an MCS index table; and at least one set of the plurality sets of parameters in the MCS index table corresponds to Regular Amplitude Phase Shift Keying (RAPSK) modulation.

An embodiment of the present disclosure further provides a storage medium containing a computer-executable instruction which, when executed by a computer processor, causes the processor to carry out the method for data transmission applied to a second communication node, the method includes, receiving a Modulation and Coding Scheme (MCS) index value sent by a first communication node; where the MCS index value is indicative of one of a plurality sets of parameters in an MCS index table; and at least one set of the plurality sets of parameters in the MCS index table corresponds to Regular Amplitude Phase Shift Keying (RAPSK) modulation.

It should be understood by those having ordinary skills in the art that the term user equipment covers any suitable type of wireless user equipment, such as a mobile phone, a portable data processing device, a portable web browser, or a vehicle-mounted mobile station.

Generally, various embodiments of the present disclosure may be implemented as hardware or dedicated circuits, software, logic or any suitable combination thereof. For example, some aspects may be implemented as hardware, while other aspects may be implemented as firmware or software executable by a controller, microprocessor or other computing device, although the present disclosure is not limited thereto.

Some embodiments of the present disclosure can be implemented by a data processor of a mobile device executing computer program instructions, for example, in a processor entity, or by hardware, or by a combination of software and hardware. Computer program instructions can be assembly instructions, instruction set architecture (ISA) instructions, machine instructions, machine-related instructions, microcode, firmware instructions, state setting data, or source code or object code written in any combination of one or more programming languages.

The block diagram of any logic flow in the drawings of the present disclosure may represent program process, or may represent interconnected logic circuits, modules and functions, or may represent the combination of program process and logic circuits, modules and functions. Computer programs can be stored in the memory. The memory can be of any type suitable for the local technical environment and can be realized with any suitable data storage technology, such as, but not limited to, read-only memory (ROM), random access memory (RAM), optical memory devices and systems like Digital Video Disc (DVD), or Compact Disk (CD) etc. Computer-readable media may include non-transitory storage media. The data processor can be of any type suitable for the local technical environment, such as but not limited to a general-purpose computer, a special-purpose computer, a microprocessor, a digital signal processor (DSP), an application-specific integrated circuit (ASIC), a programmable logic device (FGPA) and a processor based on a multi-core processor architecture.

Some embodiments of the present disclosure are described above, However, the present disclosure is not limited by those embodiments described. Various modifications and alternations can be made by those having ordinary skill in the art. Any modifications, equivalents, alternations, or improvements, made within the concepts of the present disclosure shall be included in the scope of protection of the present disclosure.

What is claimed is:

1. A method for data transmission, applied to a first communication node, the method comprising, sending in downlink control information a Modulation and Coding Scheme (MCS) index value to a second communication node;

wherein, the MCS index value is indicative of one sets of parameters of a plurality sets of parameters in an MCS index table; and at least one set of the plurality sets of parameters in the MCS index table correspond to Regular Amplitude Phase Shift Keying (RAPSK) modulation;

wherein, the MCS index table comprises the RAPSK modulation mapping; and in the MCS index table:

a spectral efficiency corresponding to the RAPSK modulation scheme is configured to be greater than 1.3 and less than 3.1, in response to the modulation order being 4;

a spectral efficiency corresponding to the RAPSK modulation scheme is configured to be greater than 2.5 and less than 5.2, in response to the modulation order being 6;

a spectral efficiency corresponding to the RAPSK modulation scheme is configured to be greater than 4.5 and less than 7.1, in response to the modulation order being 8; and a spectral efficiency corresponding to the RAPSK modulation scheme is configured to be greater than 6.5 and less than 9.3, in response to the modulation order being 10.

2. The method as claimed in claim 1, wherein the MCS index table comprises at least one of, MCS index value; modulation order; target code rate; spectrum efficiency; number of concentric rings; number of constellation points on each concentric ring or different modulation phases on each concentric ring; number bits for amplitude mapping; number of bits for phase mapping; minimum radius; inter-ring distance; or RAPSK modulation mapping scheme.

3. The method as claimed in claim 2, wherein at least one MCS index value in the MCS index table corresponds to Quadrature Amplitude Modulation (QAM) modulation.

4. The method as claimed in claim 3, wherein in the MCS index table, a modulation order of the QAM modulation is the maximum modulation order in the MCS index table.

5. The method as claimed in claim 3, wherein a modulation scheme corresponding to the maximum spectral efficiency in the MCS index table is the QAM modulation.

6. The method as claimed in claim 1, wherein the RAPSK modulation comprises RAPSK with Gray mapping.

7. A method for data transmission, applied to a second communication node, the method comprising, receiving in downlink control information a Modulation and Coding Scheme (MCS) index value sent by a first communication node;

wherein, the MCS index value is indicative of one set of parameters of a plurality sets of parameters in an MCS index table; and at least one set of the plurality sets of parameters in the MCS index table corresponds to Regular Amplitude Phase Shift Keying (RAPSK) modulation;

wherein, the MCS index table comprises the RAPSK modulation mapping; and in the MCS index table:

a spectral efficiency corresponding to the RAPSK modulation scheme is configured to be greater than 1.3 and less than 3.1, in response to the modulation order being 4;

a spectral efficiency corresponding to the RAPSK modulation scheme is configured to be greater than 2.5 and less than 5.2, in response to the modulation order being 6;

a spectral efficiency corresponding to the RAPSK modulation scheme is configured to be greater than 4.5 and less than 7.1, in response to the modulation order being 8; and a spectral efficiency corresponding to the RAPSK modulation scheme is configured to be greater than 6.5 and less than 9.3, in response to the modulation order being 10.

8. An apparatus for data transmission, comprising: a communication module, a memory, and at least one processor; wherein, the communication module is configured to perform communication interaction between a first communication node and a second communication node; and the memory is configured to store at least one program which, when executed by the at least one processor, causes the at least one processor to carry out the method as claimed in claim 1.

9. A non-transitory computer-readable storage medium storing a computer program which, when executed by a processor, causes the processor to carry out the method as claimed in claim 1.

10. The apparatus as claimed in claim 8, wherein the MCS index table comprises at least one of, MCS index value; modulation order; target code rate; spectrum efficiency; number of concentric rings; number of constellation points on each concentric ring or different modulation phases on each concentric ring; number bits for amplitude mapping; number of bits for phase mapping; minimum radius; inter-ring distance; RAPSK modulation mapping scheme.

11. The apparatus as claimed in claim 10, wherein at least one MCS index value in the MCS index table corresponds to Quadrature Amplitude Modulation (QAM) modulation.

12. The apparatus as claimed in claim 11, wherein in the MCS index table, a modulation order of the QAM modulation is the maximum modulation order in the MCS index table.

13. The apparatus as claimed in claim 11, wherein a modulation scheme corresponding to the maximum spectral efficiency in the MCS index table is the QAM modulation.

14. The non-transitory computer-readable storage medium as claimed in claim 9, wherein the MCS index table comprises at least one of, MCS index value; modulation order; target code rate; spectrum efficiency; number of concentric rings; number of constellation points on each concentric ring or different modulation phases on each concentric ring; number bits for amplitude mapping; number of bits for phase mapping; minimum radius; inter-ring distance; RAPSK modulation mapping scheme.

15. The non-transitory computer-readable storage medium as claimed in claim 14, wherein at least one MCS index value in the MCS index table corresponds to Quadrature Amplitude Modulation (QAM) modulation.

16. The non-transitory computer-readable storage medium as claimed in claim 14, wherein in the MCS index table, a modulation order of the QAM modulation is the maximum modulation order in the MCS index table.

* * * * *